United States Patent
Asakura et al.

(10) Patent No.: US 9,807,271 B2
(45) Date of Patent: Oct. 31, 2017

(54) FUNCTION PERFORMING APPARATUS, NON-TRANSITORY COMPUTER-READABLE MEDIUM STORING COMPUTER-READABLE INSTRUCTIONS FOR COMMUNICATION APPARATUS, AND COMMUNICATION APPARATUS

(71) Applicant: Brother Kogyo Kabushiki Kaisha, Nagoya-shi, Aichi-ken (JP)

(72) Inventors: Hirotaka Asakura, Nagoya (JP); Takanobu Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/008,928

(22) Filed: Jan. 28, 2016

(65) Prior Publication Data

US 2016/0227071 A1 Aug. 4, 2016

(30) Foreign Application Priority Data

Jan. 30, 2015 (JP) .................................. 2015-017427

(51) Int. Cl.
*H04N 1/32* (2006.01)
*H04W 76/02* (2009.01)
*H04W 84/12* (2009.01)

(52) U.S. Cl.
CPC ... *H04N 1/32496* (2013.01); *H04N 2201/006* (2013.01); *H04W 76/023* (2013.01); *H04W 84/12* (2013.01)

(58) Field of Classification Search
USPC ....................................................... 358/1.15
See application file for complete search history.

(56) References Cited

U.S. PATENT DOCUMENTS

| 8,125,673 B2 | 2/2012 | Nagasawa |
| 8,493,576 B2 | 7/2013 | Enomoto |
| 2007/0013562 A1 | 1/2007 | Nagasawa |

(Continued)

FOREIGN PATENT DOCUMENTS

| JP | 2007-028179 A | 2/2007 |
| JP | 2007-251781 A | 9/2007 |
| JP | 2013-187566 A | 9/2013 |

OTHER PUBLICATIONS

Wi-Fi Alliance Technical Committee P2P Task Group, "Wi-Fi Peer-to Peer (P2P) Technical Specification", Version 1.1, pp. 1-159, 2010.

*Primary Examiner* — Ngon Nguyen
(74) *Attorney, Agent, or Firm* — Banner & Witcoff, Ltd.

(57) ABSTRACT

A function performing apparatus may perform: judging whether the function performing apparatus is in a placed state or a non-placed state; causing a scan performing unit to perform a scanning of the document, in a first case where a communication session is established while the function performing apparatus is in the placed state; not causing the scanner to perform the scanning of the document, in a second case where the communication session is established while the function performing apparatus is in the non-placed state; creating, in a case where the scanning of the document is performed, image data based on a scan result obtained from the scanner; and sending the created image data to a communication apparatus via an interface by using a wireless network.

17 Claims, 14 Drawing Sheets

(56) References Cited

U.S. PATENT DOCUMENTS

| | | |
|---|---|---|
| 2007/0216968 A1 | 9/2007 | Enomoto |
| 2013/0229673 A1* | 9/2013 | Nakayama ......... H04N 1/00127 358/1.13 |
| 2014/0063537 A1* | 3/2014 | Nishikawa ............ H04W 4/008 358/1.15 |
| 2014/0078549 A1* | 3/2014 | Amiya ............... H04N 1/00233 358/1.15 |

* cited by examiner

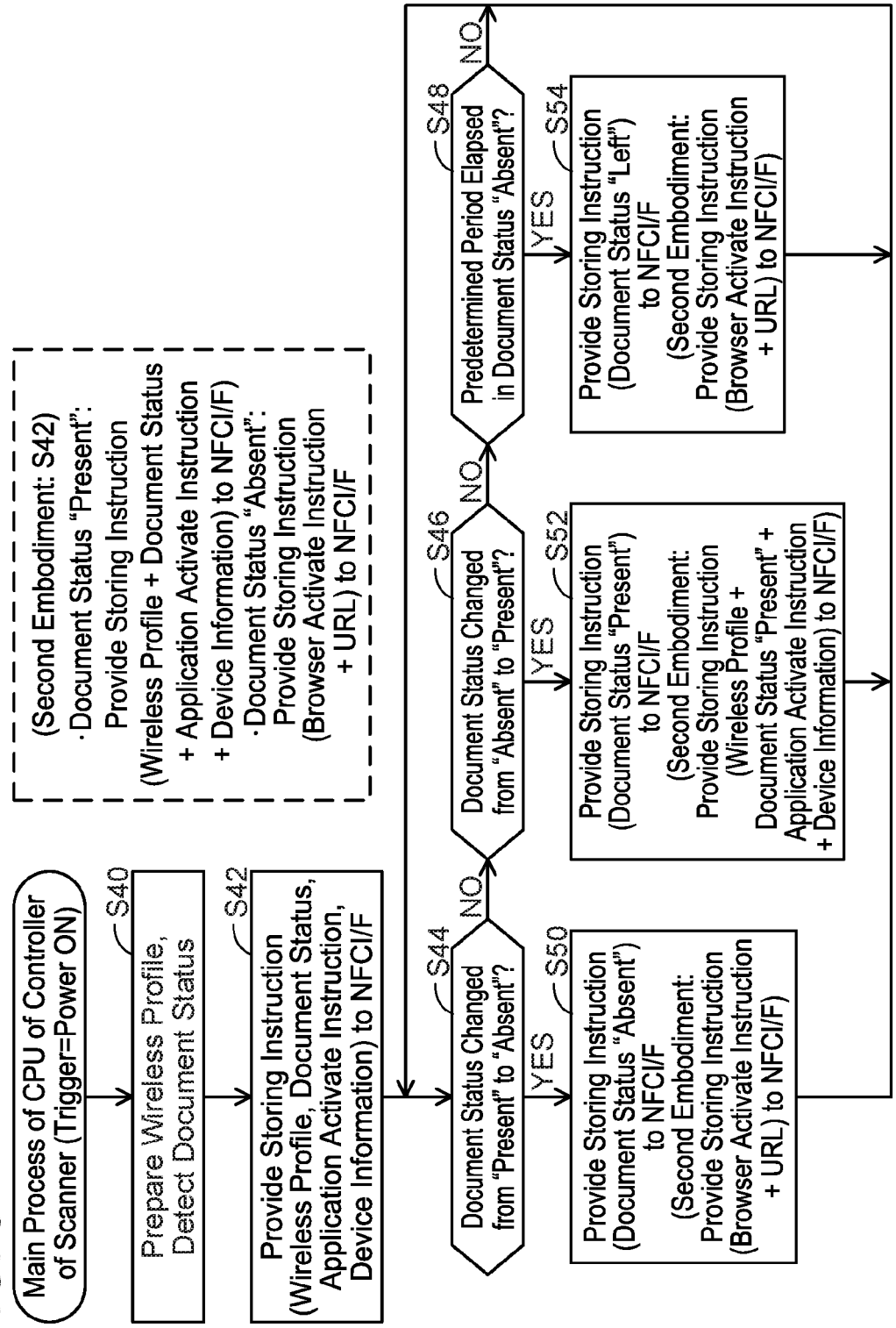

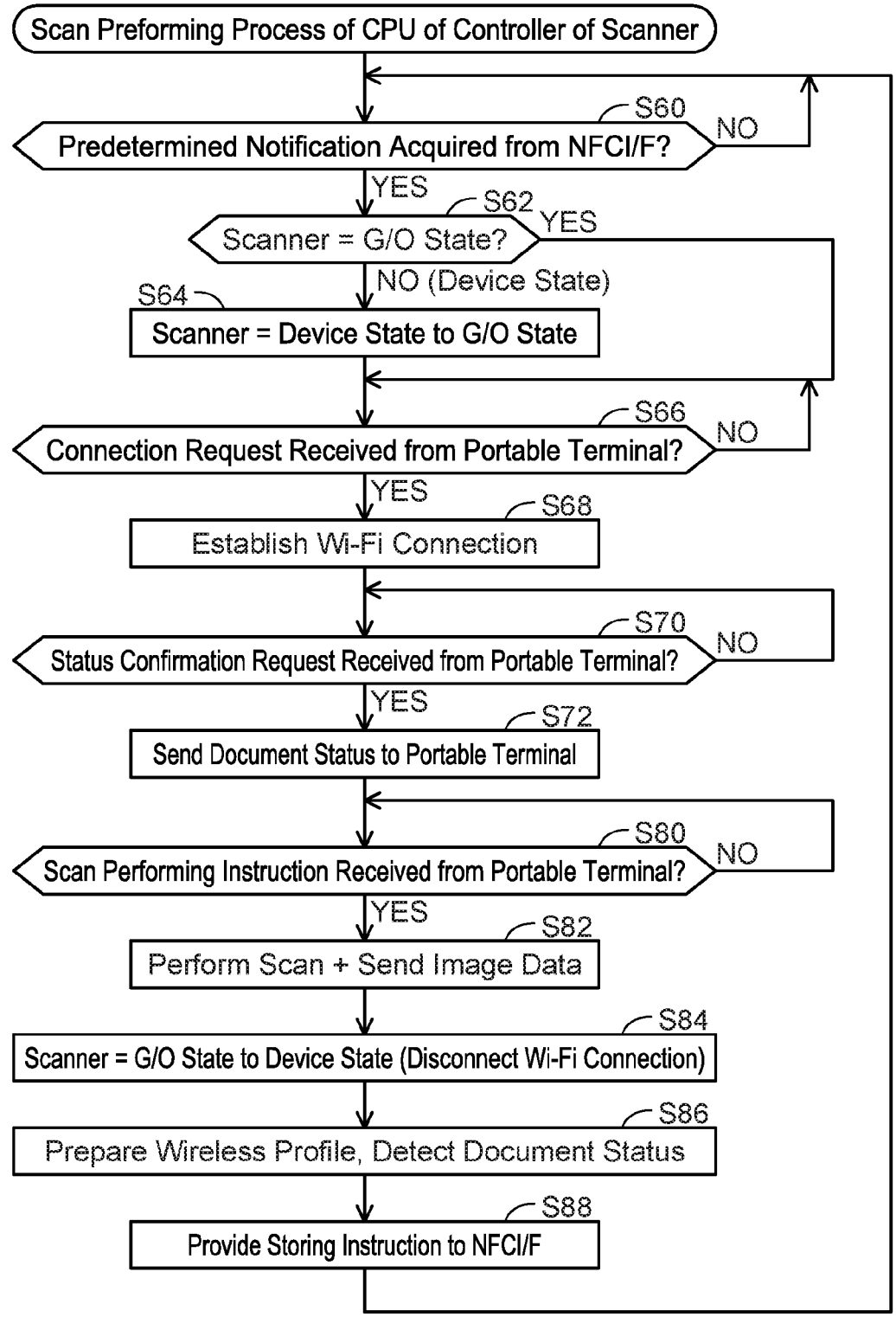

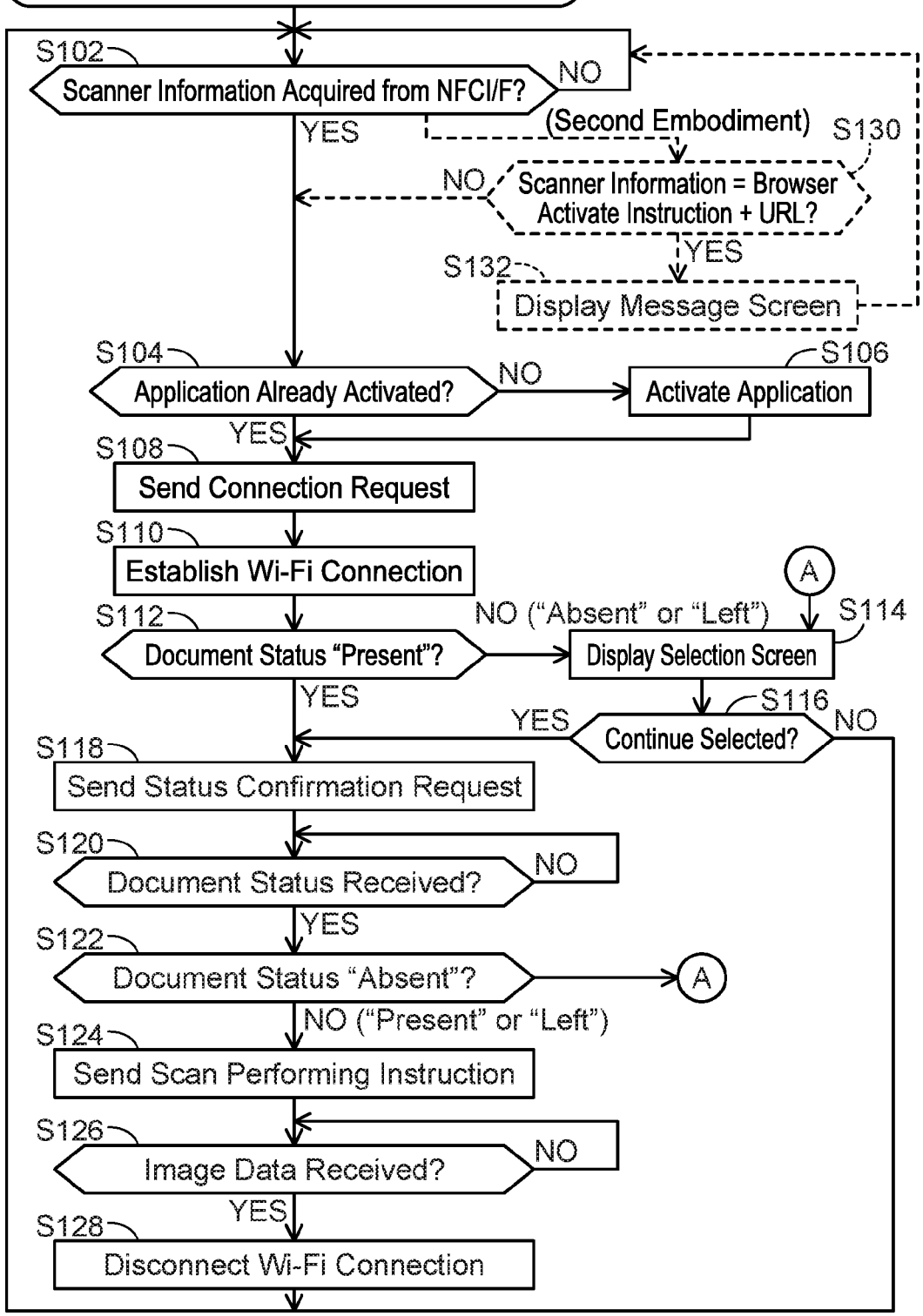
FIG. 5 (First, Second Embodiments)

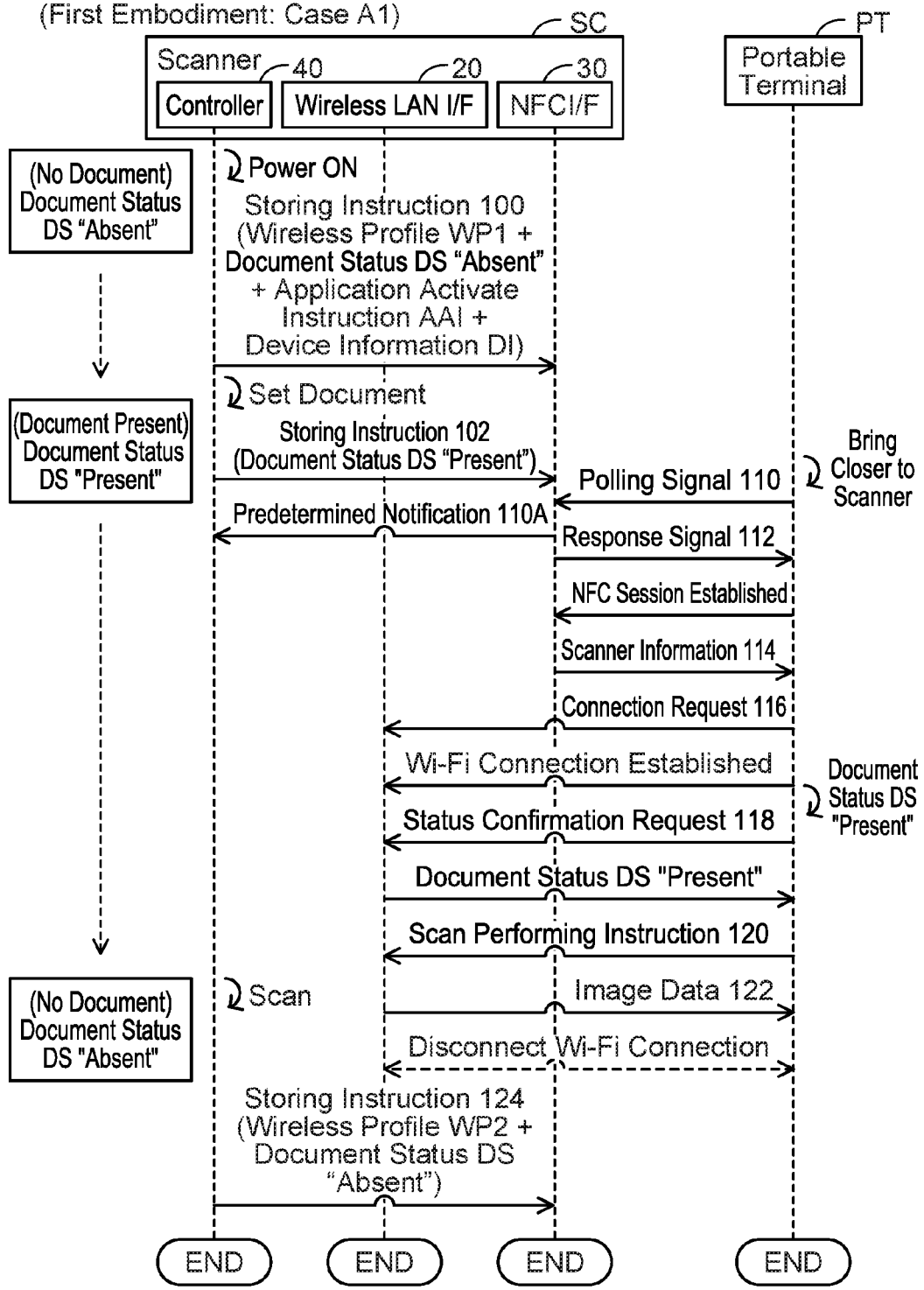

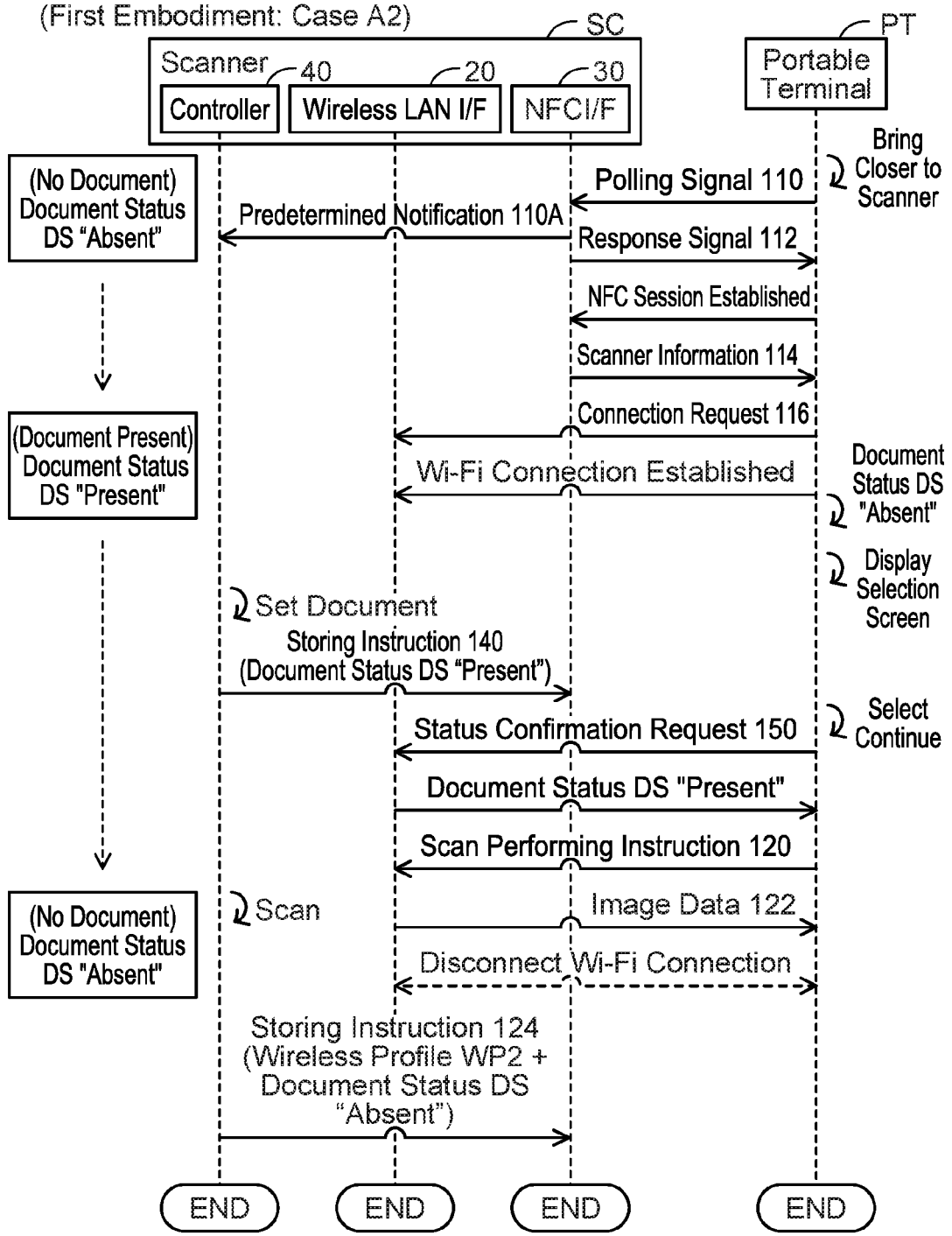

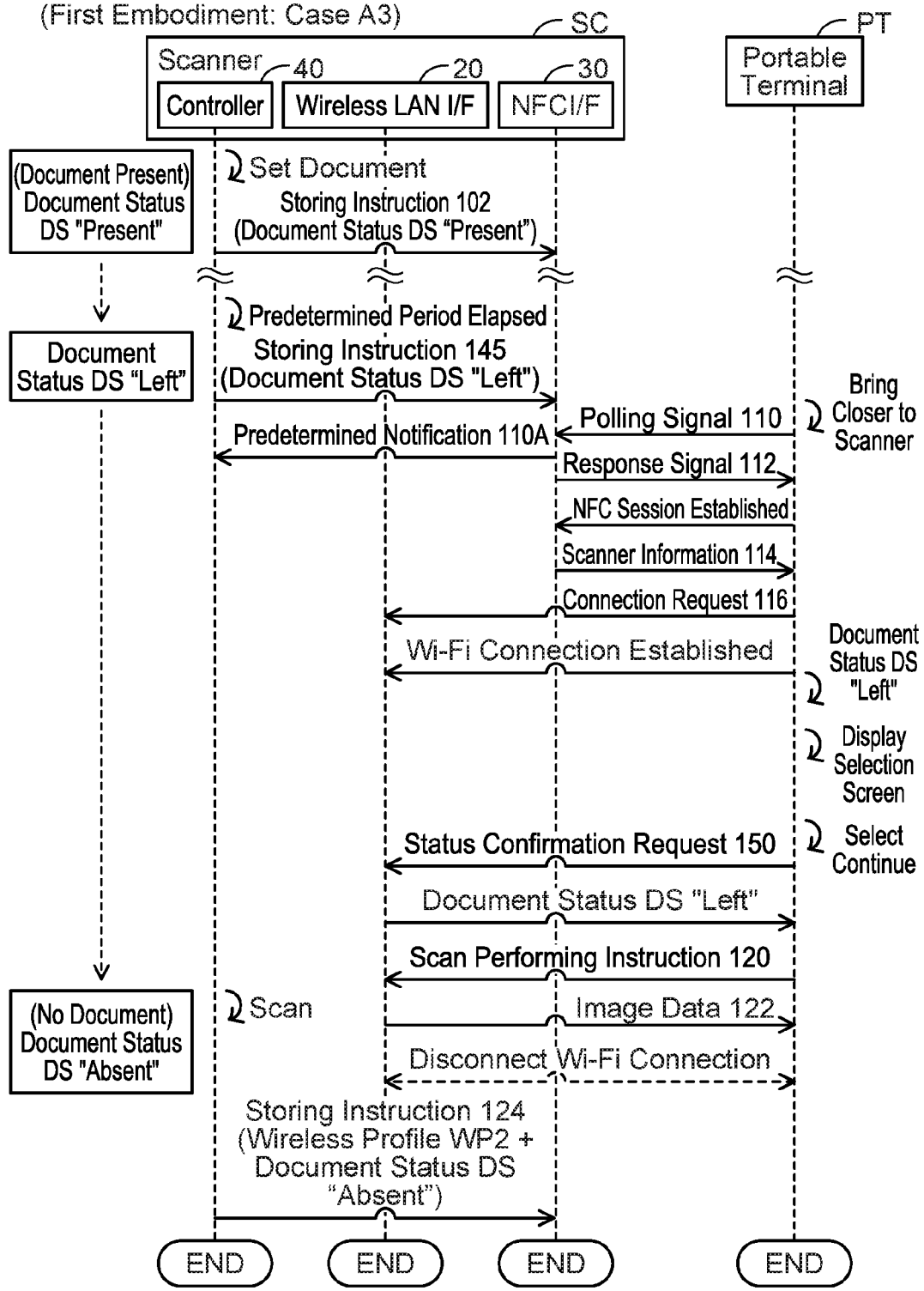

FIG. 9

(First Embodiment)

| Setting Situation of Document | Stored Contents of I/F Memory (Scanner Information) |
|---|---|
| Not Set (Absent) | Wireless Profile WP, Document Status DS "Absent", Application Activate Instruction AAI, Device Information DI |
| Set + Predetermined Period Not Elapsed (Present) | Wireless Profile WP, Document Status DS "Present", Application Activate Instruction AAI, Device Information DI |
| Set + Predetermined Period Elapsed (Left) | Wireless Profile WP, Document Status DS "Left", Application Activate Instruction AAI, Device Information DI |

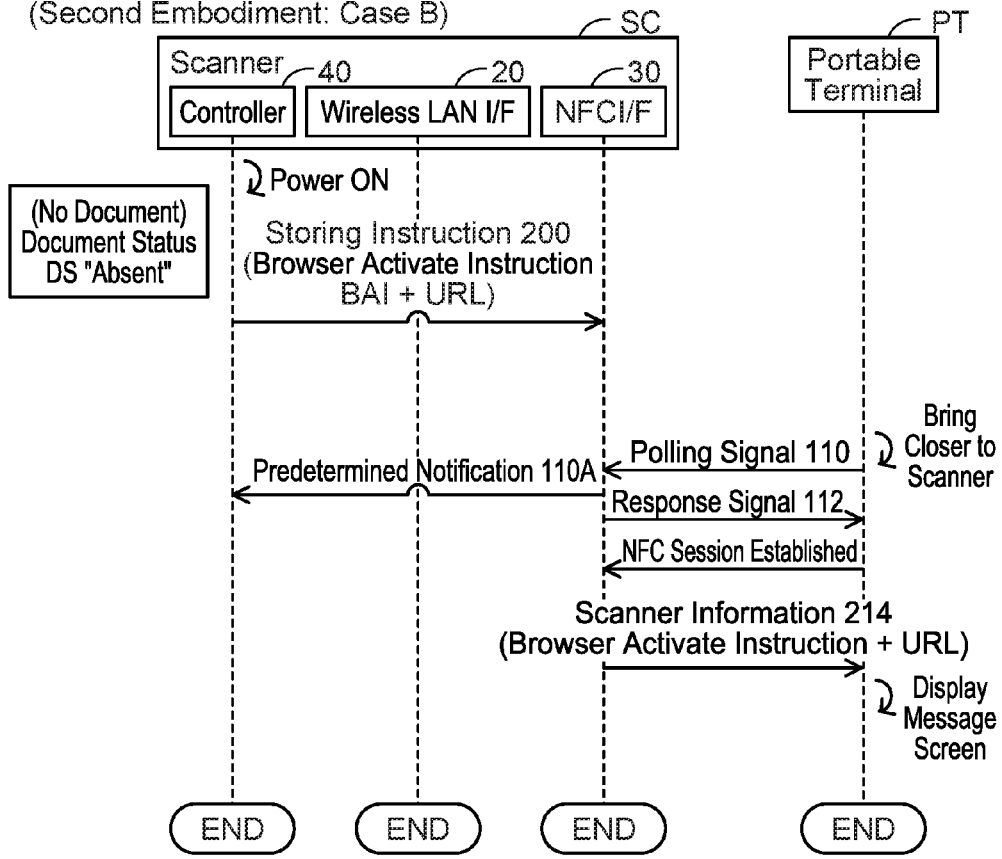

FIG. 11

(Second Embodiment)

| Setting Situation of Document | Stored Contents of I/F Memory (Scanner Information) |
|---|---|
| Not Set (Absent) | Browser Activate Instruction, URL |
| Set + Predetermined Period Not Elapsed (Present) | Wireless Profile WP, Document Status DS "Present", Application Activate Instruction AAI, Device Information DI |
| Set + Predetermined Period Elapsed (Left) | Browser Activate Instruction, URL |

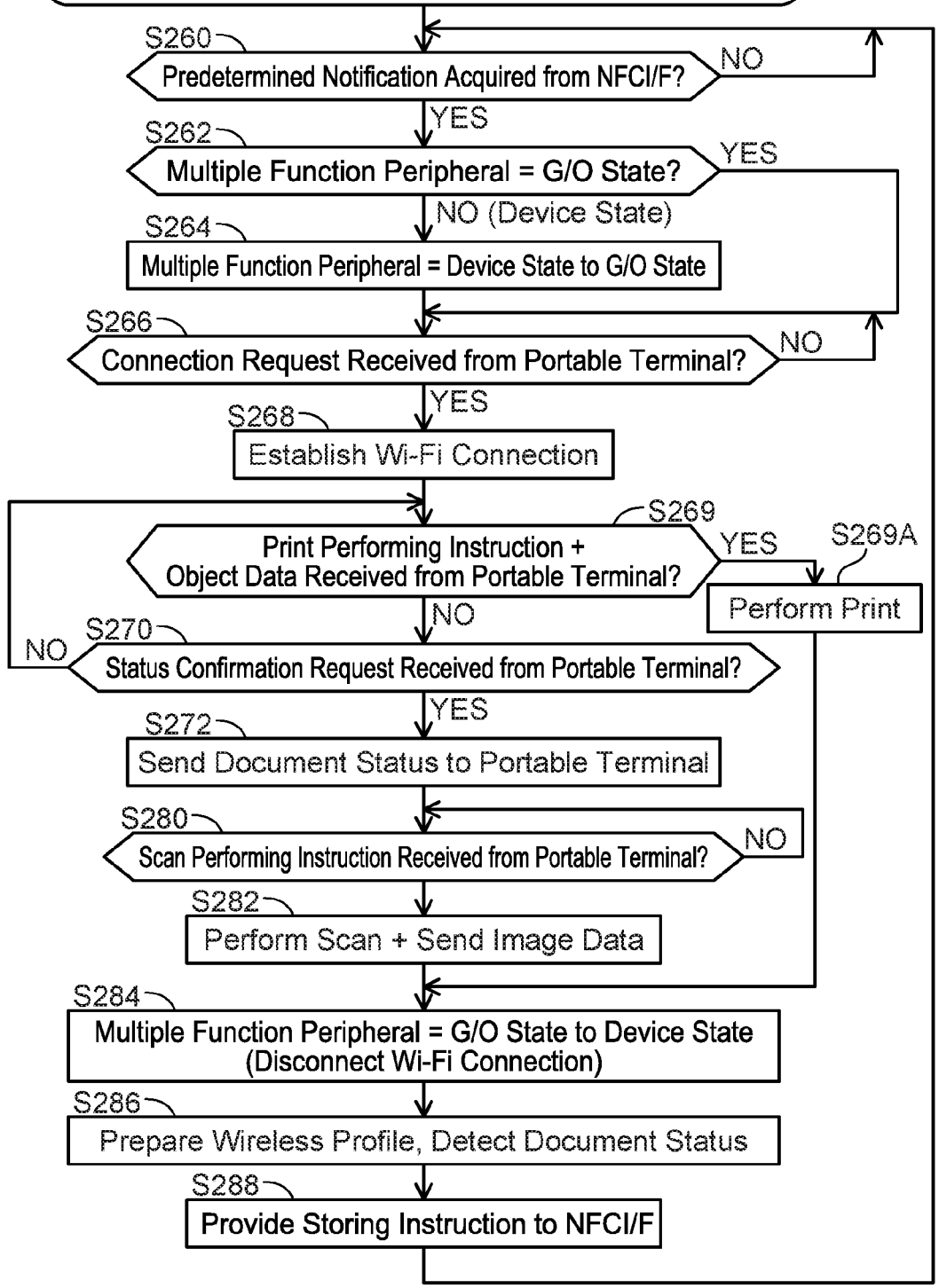

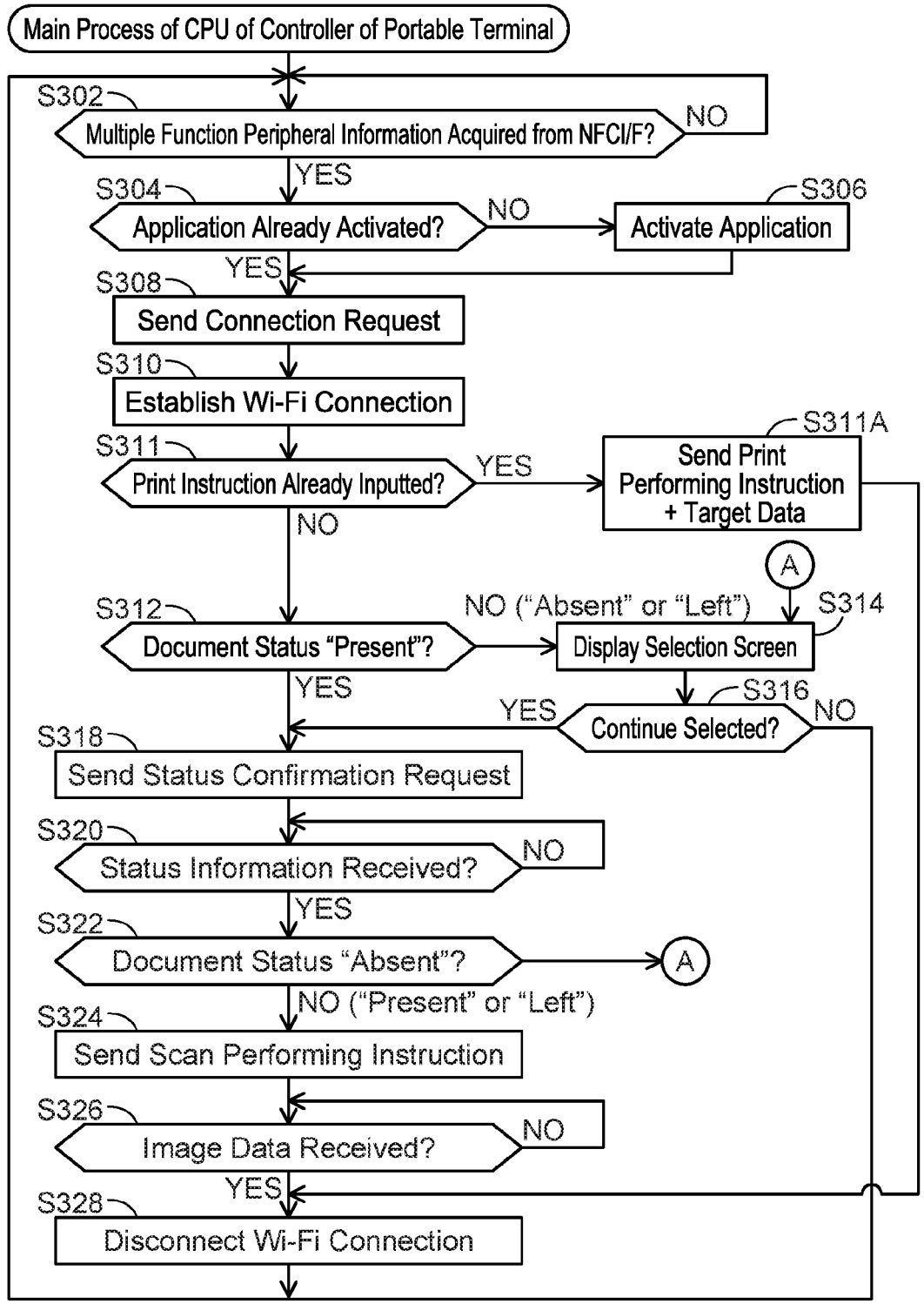
FIG. 13 (Third Embodiment)

(Third Embodiment: Case C)

FUNCTION PERFORMING APPARATUS, NON-TRANSITORY COMPUTER-READABLE MEDIUM STORING COMPUTER-READABLE INSTRUCTIONS FOR COMMUNICATION APPARATUS, AND COMMUNICATION APPARATUS

CROSS-REFERENCE TO RELATED APPLICATIONS

This application claims priority to Japanese Patent Application No. 2015-17427, filed on Jan. 30, 2015, the contents of which are hereby incorporated by reference into the present application.

TECHNICAL FIELD

The technique disclosed in the present specification relates to a function performing apparatus and a communication apparatus capable of communicating with the function performing apparatus.

DESCRIPTION OF RELATED ART

Japanese Patent Application Publication Number 2007-28179 discloses an image forming device operating in two modes, a first mode for reading and printing data in a USB memory, and a second mode for storing image data read by a scanner unit in the USB memory. In a case where a document detecting sensor detects a document when the USB memory has been connected to a memory slot, the image forming device judges that the second mode has been instructed, and causes a display unit to display an operation screen for the second mode. When a user inputs a scan instruction on the operation screen for the second mode, the image forming device performs a scan of the document. On the other hand, in a case where the document detecting sensor has not detected a document when the USB memory has been connected to the memory slot, the image forming device judges that the user has instructed the first mode, and causes the display unit to display an operation screen for the first mode. When the user inputs a print instruction on the operation screen for the first mode, the image forming device performs a print according to the data designated by the user.

In the technique of Japanese Patent Application Publication Number 2007-28179, the user must input a predetermined instruction for performing a scan or print on the operation screen after connecting the USB memory to the memory slot.

SUMMARY

In the present specification, a technique is provided allowing a function performing apparatus to appropriately perform a scan even if the user does not give an instruction to the function performing apparatus and a communication apparatus.

A function performing apparatus may comprise: a first interface configured to perform a wireless communication in accordance with a first scheme by using a communication session being established between the function performing apparatus and a communication apparatus different from the function performing apparatus, the first interface configured to send to the communication apparatus, by using the communication session, network information which is to be used in a wireless network; a second interface configured to perform a wireless communication in accordance with a second scheme different from the first scheme by using the wireless network to which both the function performing apparatus and the communication apparatus are to belong; a scan performing unit configured to perform a scanning of a document to be placed on the function performing apparatus; a sensor configured to detect whether the document is being placed on the function performing apparatus; a processor; and a memory storing computer-readable instructions therein, the computer-readable instructions, when executed by the processor, causing the function performing apparatus to perform: determining, by using a detection result of the sensor, whether the function performing apparatus is in a placed state or a non-placed state, the placed state being a state where the document is being placed on the function performing apparatus, and the non-placed state being a state where the document is not being placed on the function performing apparatus; causing the scan performing unit to perform the scanning of the document, in a first case where the communication session is established while the function performing apparatus is in the placed state, even if an instruction related to a starting of the scanning is not given by a user to the function performing apparatus and the communication apparatus after the communication session has been established by using the first interface, the causing of the scan performing unit to perform the scanning being not performed, in a second case where the communication session is established while the function performing apparatus is in the non-placed state; creating, in a case where the scanning of the document is performed, image data based on a scan result obtained from the scan performing unit; and sending the created image data to the communication apparatus via the second interface by using the wireless network.

A non-transitory computer-readable medium may store computer-readable instructions for a communication apparatus, wherein the computer-readable instructions, when executed by a processor mounted on the communication apparatus, cause the communication apparatus to perform: receiving, from a function performing apparatus different from the communication apparatus, network information being to be used in a wireless network to which both the communication apparatus and the function performing apparatus are to belong, via a first interface of the communication apparatus, the wireless network being a network for performing a wireless communication between the communication apparatus and the function performing apparatus via a second interface of the communication apparatus, the first interface being an interface configured to perform a wireless communication in accordance with a first scheme, and the second interface being an interface configured to perform a wireless communication in accordance with a second scheme different from the first scheme; receiving related information related to a state of the function performing apparatus from the function performing apparatus via at least one of the first interface and the second interface; sending a scan performing instruction to the function performing apparatus via the second interface by using the wireless network, in a first case where the received related information is placed related information, even if an instruction related to a starting of a scanning is not given by a user to the function performing apparatus and the communication apparatus after a communication session has been established by using the first interface, the placed related information being information related to a placed state, and the placed state being a state where a document is being placed on the function performing apparatus, the sending of the scan performing instruction being not performed, in a second case where the received related information is non-placed related information, the non-placed related information being information related to a non-placed state, the non-placed state being a state where the document is not being placed on the function performing apparatus; and receiving image data from the function performing apparatus via the second interface by using the wireless network after the scan performing instruction has been sent to the function performing apparatus, the image data being created by the function performing apparatus scanning the document.

Moreover, a control method for implementation of the aforementioned function performing apparatus, a computer program, and a computer-readable recording medium which stores the computer program, are also novel and useful. Further, a communication apparatus realized by a computer program for the aforementioned communication apparatus, and a computer-readable recording medium which stores the computer program for the aforementioned communication apparatus, are also novel and useful. Further, a function performing system which includes the aforementioned function performing apparatus and the communication apparatus is also novel and useful.

BRIEF DESCRIPTION OF DRAWINGS

FIG. 3 shows a flowchart of a main process of a CPU of a controller of a scanner of the first embodiment;

FIG. 4 shows a flowchart of a scan performing process of the CPU of the controller of the scanner of the first embodiment;

FIG. 5 shows a flowchart of a main process of a CPU of a controller of a portable terminal of the first embodiment;

FIG. 6 shows a sequence diagram of a case A1, in the first embodiment, in which the portable terminal is brought closer to the scanner in a state of having a document set thereon;

FIG. 7 shows a sequence diagram of a case A2, in the first embodiment, in which the portable terminal is brought closer to the scanner in a state of not having a document set thereon;

FIG. 8 shows a sequence diagram of a case A3, in the first embodiment, in which the portable terminal is brought closer to the scanner in a state of a predetermined period having elapsed since a document was set thereon;

FIG. 9 shows a table of information stored in an interface memory in each of the cases of the first embodiment;

FIG. 10 shows a sequence diagram of a case B, in a second embodiment, in which the portable terminal is brought closer to the scanner in a state of not having a document set thereon;

FIG. 11 shows a table of information stored in the interface memory in each of the cases of the second embodiment;

FIG. 12 shows a flowchart of a function performing process of a CPU of a controller of a multiple function peripheral of a third embodiment;

FIG. 13 shows a flowchart of a main process of a CPU of a controller of a portable terminal of the third embodiment.

EMBODIMENT

Figure 1:
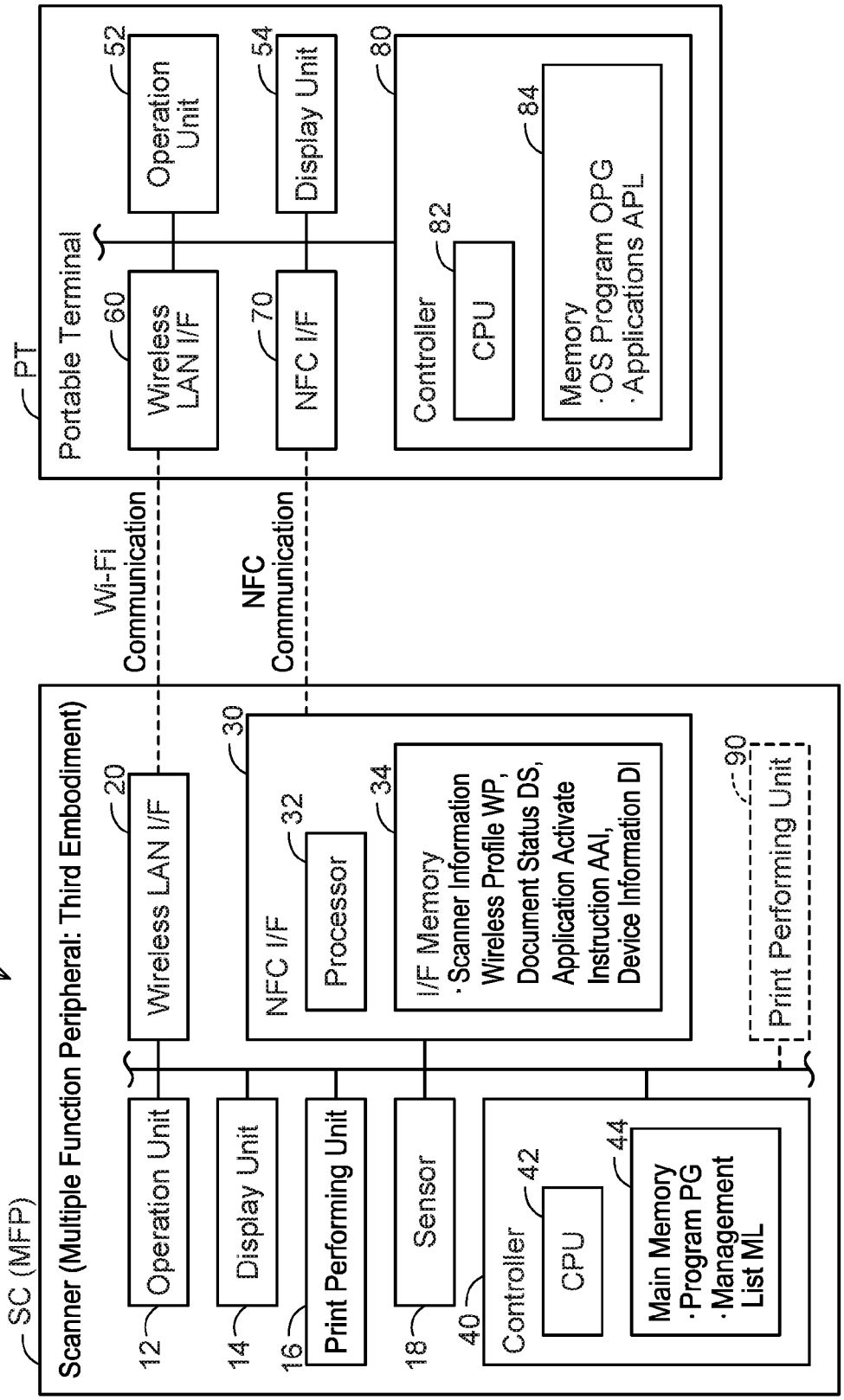
FIG. 1 shows a configuration of a function performing system.

Configuration of Function Performing System 2; FIG. 1

As shown in FIG. 1, a function performing system 2 comprises a scanner SC and a portable terminal PT. The devices SC and PT are capable of performing a wireless communication in accordance with a Wi-Fi scheme (called "Wi-Fi communication" below), and a wireless communication in accordance with an NFC (abbreviation of Near Field Communication) scheme (called "NFC Communication" below). In the example of FIG. 1, only one portable terminal PT is shown, however, in another example, the function performing system 2 may comprise a plurality of portable terminals.

(Configuration of Scanner SC)

The scanner SC is a peripheral apparatus (i.e., a peripheral apparatus of the portable terminal PT) capable of performing a scan function. The scanner SC comprises an operation unit 12, a display unit 14, a scan performing unit 16, a sensor 18, a wireless LAN (abbreviation of Local Area Network) interface 20, an NFC interface 30 and a controller 40. The units 12 to 40 are connected to a bus line (reference number omitted). Moreover, in a modification, the sensor 18 may be included in the scan performing unit 16. Below, interface is referred to as "I/F". In FIG. 1, a print performing unit 90 is shown by a broken line, meaning that the scanner SC of the present embodiment does not comprise the print performing unit 90. The print performing unit 90 will be described later in a third embodiment.

The operation unit 12 comprises a plurality of buttons. A user can give various instructions to the scanner SC by operating the operation unit 12. The display unit 14 is a display for displaying various types of information. The scan performing unit 16 is a CCD, CIS, etc. scanning mechanism. Although not shown, the scanner SC comprises an ADF (abbreviation of Auto Document Feeder). The ADF provides a scanning mechanism to a document that has been set (i.e., placed). The sensor 18 detects a document that has been set on the ADF.

The wireless LAN I/F 20 is a wireless I/F for performing a wireless communication in accordance with the Wi-Fi scheme. The Wi-Fi scheme is a wireless communication scheme for performing a wireless communication in accordance with, e.g., IEEE (abbreviation of The Institute of Electrical and Electronics Engineers, Inc.) standard 802.11 or standards conforming thereto (e.g., 802.11a, 11b, 11g, 11n, etc.). The wireless LAN I/F 20 particularly supports a WFD (abbreviation of Wi-Fi Direct) scheme. The WFD scheme is a wireless communication scheme described in "Wi-Fi Peer-to-Peer (P2P) Technical Specification Version 1.1." created by the Wi-Fi Alliance.

The NFC I/F 30 is a wireless I/F for performing an NFC Communication (i.e., a type of so-called near field wireless communication) in accordance with the NFC scheme. The NFC scheme is a wireless communication scheme based on, e.g., international standard ISO/IEC 21481 or 18092.

The NFC I/F 30 comprises a processor 32 and an I/F memory 34. The processor 32 is capable of communicating with the controller 40 and, in accordance with a storing instruction acquired from the controller 40, writes to the I/F memory 34 (i.e., stores) a wireless profile WP to be sent to the portable terminal PT, a document status DS based on a detection result of the sensor 18, an application activate instruction AAI for activating an application for the portable terminal PT to cause the scanner SC to perform the scan function, and device information DI indicating model, model number, etc. of the scanner SC. The application activate instruction AAI and the device information DI are fixed values determined in advance before shipping of the scanner SC by the vendor of the scanner SC. As described later, the application activate instruction AAI and the device information DI that are the same each time are written to the I/F memory 34 by a CPU 42 supplying a storing instruction to the NFC I/F 30 when power of the scanner SC is activated. Below, the information stored in the I/F memory 34 (i.e., the wireless profile WP, the document status DS, the application activate instruction AAI, and the device information DI) may be called "scanner information". Further, application may be called "appl" below.

Further, in the case of receiving a Polling signal from the portable terminal PT, the processor 32 sends a response signal in response to the Polling signal to the portable terminal PT, and establishes an NFC session with the portable terminal PT. Before the NFC session is established, the processor 32 reads the scanner information being stored in the I/F memory 34 at that time (i.e., the wireless profile WP, the document status DS, the application activate instruction AAI, and the device information DI) from the I/F memory 34, and sends the scanner information to the portable terminal PT by using the NFC session.

Moreover, an NFC forum device (NFC Forum Device) I/F and an NFC forum tag (NFC Forum Tag) I/F are known as types of I/F for performing NFC communication. The NFC I/F 30 is an NFC forum tag, and functions as an IC tag of the NFC scheme.

The NFC forum device is an I/F capable of selectively operating in any mode of P2P (abbreviation of Peer To Peer) mode, R/W (abbreviation of Reader/Writer) mode, and CE (abbreviation of Card Emulation) mode. For example, in a case where both the NFC I/F of a first apparatus and the NFC I/F of a second apparatus are operating in P2P mode, the first and second apparatuses can perform two-way communication of data. Further, e.g., in a case where the NFC I/F of the first apparatus is operating in Reader mode of R/W mode, and the NFC I/F of the second apparatus is operating in CE mode, the first apparatus can read data from the second apparatus, i.e., can perform reception of data from the second apparatus. Further, e.g., in a case where the NFC I/F of the first apparatus is operating in Writer mode of R/W mode, and the NFC I/F of the second apparatus is operating in CE mode, the first apparatus can write data to the second apparatus, i.e., can perform the sending of data to the second apparatus.

The NFC forum tag (i.e., the NFC I/F 30 of the scanner SC) is not an I/F capable of selectively operating in any mode of the three modes described above, but is an I/F functioning only as an IC tag. For example, in the case where an NFC I/F 70 of the portable terminal PT is operating in Reader mode of R/W mode, the portable terminal PT can read the scanner information from the NFC I/F 30 of the scanner SC, i.e., can receive the scanner information from the scanner SC. Since the NFC forum tag (i.e., the NFC I/F 30 of the scanner SC) is not an I/F capable of selectively operating in any mode of the three modes described above, the NFC forum tag has a simpler configuration than the NFC forum device (i.e., the configuration of an IC chip is simple). In general, an IC chip functioning as an NFC forum tag is cheaper than an IC chip functioning as an NFC forum device.

Here, differences between the wireless LAN I/F 20 and the NFC I/F 30 will be described. A communication speed of a wireless communication via the wireless LAN I/F 20 (e.g., maximum communication speed is 11 to 600 Mbps) is faster than a communication speed of a wireless communication via the NFC I/F 30 (e.g., maximum communication speed is 100 to 424 Kbps). Further, a frequency of a carrier wave (e.g. a 2.4 GHz band or a 5.0 GHz band) upon a wireless communication via the wireless LAN I/F 20 is different from a frequency of a carrier wave (e.g. a 13.56 MHz band) upon a wireless communication via the NFC I/F 30. Further, a maximum distance of a wireless communication that can be performed via the wireless LAN I/F 20 (e.g., about 100 m at maximum) is greater than a maximum distance of a wireless communication that can be performed via the NFC I/F 30 (e.g., about 10 cm at maximum).

The controller 40 comprises the CPU 42 and a main memory 44. The CPU 42 is a processor which performs various processes in accordance with a program PG stored in the main memory 44. The main memory 44 is configured by a RAM, a ROM, etc., and stores a management list ML in addition to the program PG.

CL information relating to a CL apparatus belonging to a wireless network (called "WFDNW" below) in which a printer PR is a G/O apparatus is described in the management list ML. The CL apparatus is an apparatus that operates in CL state (i.e., client state) of the WFD scheme, or is a legacy apparatus not compatible with communication of the WFD scheme. The CL information includes, e.g., a MAC address of the CL apparatus.

(Configuration of Portable Terminal PT)

The portable terminal PT is a portable terminal device such as a mobile telephone (e.g. a smartphone), a PDA, a notebook PC, a tablet PC, a portable music playback device or a mobile movie playback device. The portable terminal PT comprises an operation unit 52, a display unit 54, a wireless LAN I/F 60, an NFC I/F 70 and a controller 80. Each of the units 52 to 80 is connected to a bus line (reference number omitted).

The operation unit 52 comprises a plurality of keys. The user can give various instructions to the portable terminal PT by operating the operation unit 52. The display unit 54 is a display for displaying various information. The wireless LAN I/F 60 is the same as the wireless LAN I/F 20 of the scanner SC. The NFC I/F 70 is an I/F for performing an NFC communication in accordance with the NFC scheme. The NFC I/F 70 is the aforementioned NFC forum device. In the present embodiment, the NFC I/F 70 is operating in Reader mode. Hence the controller 80 of the portable terminal PT can read information from the NFC I/F 30 of the scanner SC via the NFC I/F 70.

The controller 80 comprises a CPU 82 and a memory 84. The CPU 82 is a processor which performs various processes in accordance with an OS (abbreviation of Operation System) program OPG and an application APL stored in the memory 84.

The OS program OPG is a program for realizing a basic operation of the portable terminal PT. The application APL is a program for causing the scanner SC to perform a scan. The application APL is an application provided by the vendor of the scanner SC, and may be installed on the portable terminal PT from a server on the Internet, or may be installed on the portable terminal PT from media shipped with the scanner SC.

Figure 2:
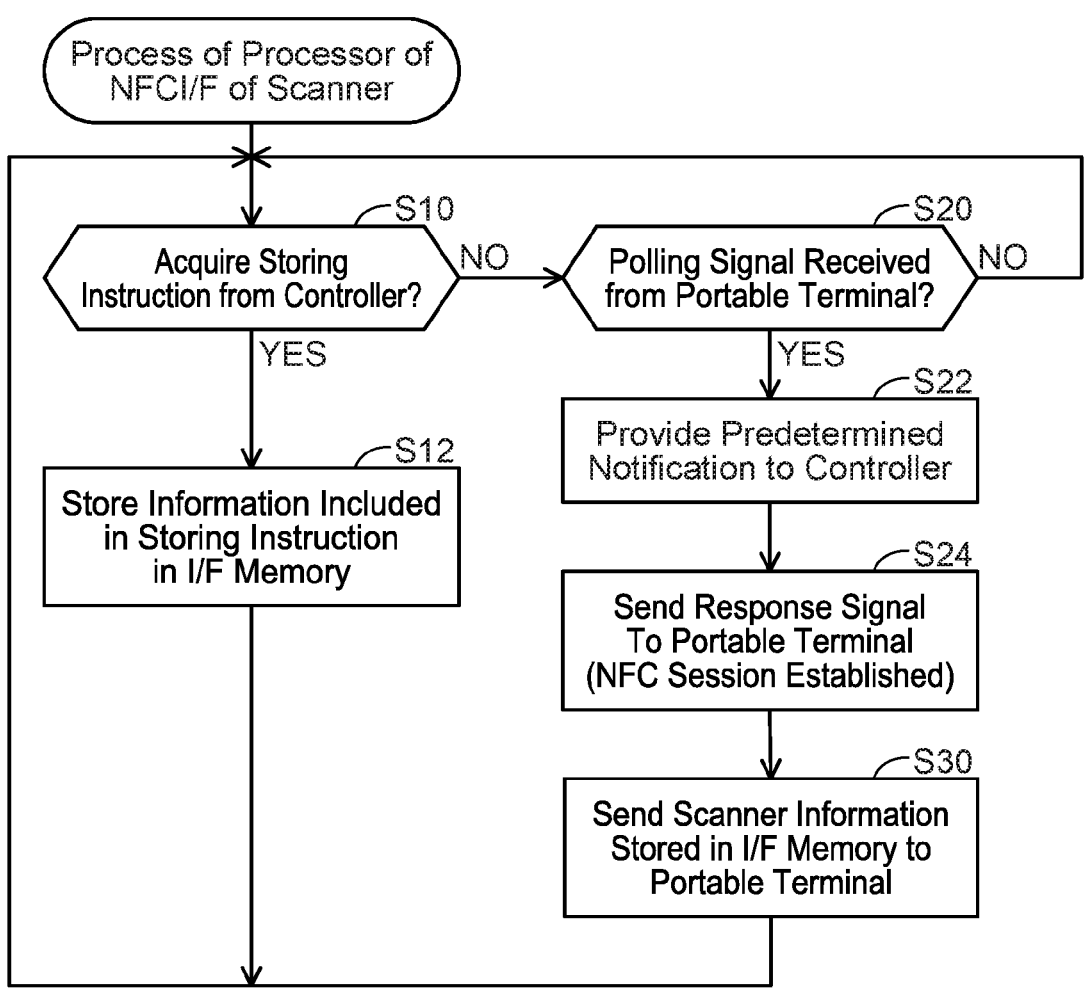
FIG. 2 shows a flowchart of a process of a processor of an NFC I/F of a scanner.

(Process of Processor 32 of NFC I/F 30 of Scanner SC; FIG. 2)

Next, the process performed by the processor 32 of the NFC I/F 30 of the scanner SC will be described with reference to FIG. 2. In the process of FIG. 2, monitoring steps S10 and S20 are performed sequentially.

In S10, the processor 32 monitors whether a storing instruction has been acquired from the controller 40 (i.e., the CPU 42). In a case where a storing instruction has been acquired from the controller 40, the processor 32 judges YES in S10 and, in S12 writes to the I/F memory 34 (i.e., stores) information included in the storing instruction acquired in S10 (i.e., at least one of the wireless profile, the document status, the application activate instruction and the device information). Moreover, in a state in which at least one of an old wireless profile and an old document status is already stored in the I/F memory 34, in S12 the processor 32 writes, to the I/F memory 34, at least one of the new wireless profile and the new document status included in the storing instruction acquired in S10 instead of at least one of the old wireless profile and the old document status. When S12 ends, the process returns to S10.

In S20, the processor 32 monitors whether a Polling signal, which is a request signal for establishing an NFC session, has been received from the portable terminal PT. When a distance between the NFC I/F 30 of the scanner SC and the NFC I/F 70 of the portable terminal PT (called "distance between devices" below) changes from a situation of being greater than a predetermined distance (e.g., 10 cm) to a situation where the distance between these devices is equal to or smaller than the predetermined distance, the processor 32 receives the Polling signal from the portable terminal, judges YES in S20, and proceeds to S22.

Next, in S22, the processor 32 provides a predetermined notification, in response to reception of the Polling signal, to the controller 40 (i.e., the CPU 42). The predetermined notification is a notification indicating that the Polling signal has been received from the portable terminal PT. In S24, the processor 32 sends a response signal in response to the Polling signal to the portable terminal. Thereby, an NFC session between the NFC I/F 30 of the scanner SC and the NFC I/F of the portable terminal is established.

Next, in S30, the processor 32 reads the scanner information from the I/F memory 34, and sends the scanner information to the portable terminal PT by using the NFC session established in S24. When S30 ends, the process returns to S10.

(Main Process of CPU 42 of Controller 40 of Scanner SC; FIG. 3)

Next, a main process performed by the CPU 42 of the controller 40 of the scanner SC will be described with reference to FIG. 3. The CPU 42 performs the main process when the power of the scanner SC is switched from OFF state to ON state.

In S40, the CPU 42 prepares the wireless profile WP. Further, the CPU 42 detects the document status DS based on a detection state of the sensor 18.

In a process of S64 of FIG. 4, to be described, the scanner SC operates in the G/O state of the WFD scheme, and forms a WFDNW. The wireless profile WP prepared in S40 is information to be used in the WFDNW. That is, the wireless profile WP prepared in S40 is information to be used in the WFDNW which can be formed in the future by the scanner SC. Consequently, for example, the portable terminal PT can participate in the WFDNW if the wireless profile WP has been received from the scanner SC. As a result, e.g., by using the WFDNW, the portable terminal PT can receive image data created from the scan result from the scanner SC. The wireless profile WP prepared in S40 includes SSID (abbreviation of Service Set Identifier), authentication scheme, encryption scheme, password, etc. The CPU 42 prepares the SSID and password by randomly selecting character strings. Further, the CPU 42 prepares an authentication scheme and encryption scheme determined in advance. When the wireless profile WP has been prepared, the CPU 42 stores the wireless profile WP in the main memory 44.

Further, the document status DS indicates one of the three: "Present", "Absent" or "Left". "Present" indicates a state in which the sensor 18 is detecting a document (i.e., a state in which a document has been set on the ADF of the scanner SC), and a predetermined period (e.g., 10 minutes) has not elapsed since the state of the sensor 18 detecting the document started. "Absent" indicates a state in which the sensor 18 is not detecting a document. "Left" indicates a state in which the sensor 18 is detecting a document, and a predetermined period (e.g., 10 minutes) has elapsed since the state of the sensor 18 detecting the document started. When the document status DS has been detected, the CPU 42 stores the document status DS in the main memory 44. Moreover, below, the case of the document status DS indicating "Present" may be called document status DS "Present". Similarly, the case of the document status DS indicating "Absent" and "Left" may respectively be called document status DS "Absent" and document status DS "Left".

In S42, the CPU 42 provides, to the NFC I/F 30, a storing instruction including the wireless profile WP prepared in S40, the document status DS detected in S40, the application activate instruction AAI and the device information DI. Thereby, the processor 32 of the NFC I/F 30 writes, to the I/F memory 34, the wireless profile WP, the document status DS, the application activate instruction AAI and the device information DI included in the storing instruction (see S12 of FIG. 2).

Next, the CPU 42 sequentially performs the monitoring steps of S44, S46, and S48. Specifically, the CPU 42 monitors whether the document status DS has changed.

In S44, the CPU 42 monitors whether the document status DS has changed from "Present" to "Absent". When the state of the sensor 18 changes from the state of detecting a document to the state of not detecting a document (i.e., a change from the state of a document being set on the ADF to the state of the document not being set), the CPU 42 judges YES in S44, and proceeds to S50. In S50, the CPU 42 provides a storing instruction including the document status DS "Absent" to the NFC I/F 30. Thereby, the processor 32 of the NFC I/F 30 writes the document status DS "Absent" included in the storing instruction to the I/F memory 34 (see S12 of FIG. 2). Moreover, the CPU 42 also stores the detected document status DS "Absent" in the main memory 44 as the new document status. When S50 ends, the process returns to the monitoring steps of S44, S46, and S48.

In S46, the CPU 42 monitors whether the document status DS has changed from "Absent" to "Present". When the state of the sensor 18 changes from a state of not detecting a document to a state of detecting a document (i.e., a change from a state of a document not being set on the ADF to a state of a document being set), the CPU 42 judges YES in S46, and proceeds to S52. In S52, the CPU 42 provides a storing instruction including the document status DS "Present" to the NFC I/F 30. Thereby, the processor 32 of the NFC I/F 30 writes the document status DS "Present" included in the storing instruction to the I/F memory 34 (see S12 of FIG. 2). Moreover, the CPU 42 also stores the detected document status DS "Present" in the main memory 44 as the new document status. When S52 ends, the process returns to the monitoring steps of S44, S46, and S48.

In S48, the CPU 42 monitors whether the predetermined period has elapsed in the document status DS "Present". When the predetermined period has elapsed since the state started of the sensor 18 detecting the document (i.e., the document status DS "Present"), the CPU 42 judges YES in S48, and proceeds to S54. In S54, the CPU 42 provides a storing instruction including the document status DS "Left" to the NFC I/F 30. Thereby, the processor 32 of the NFC I/F 30 writes the document status DS "Left" included in the storing instruction to the I/F memory 34 (see S12 of FIG. 2). Moreover, the CPU 42 also stores the document status DS "Left" in the main memory 44 as the new document status. When S54 ends, the process returns to the monitoring steps of S44, S46, and S48.

(Scan Performing Process of CPU 42 of Controller 40 of Scanner SC; FIG. 4)

Next, a scan performing process performed by the CPU 42 of the controller 40 of the scanner SC will be described with reference to FIG. 4. When the power of the scanner SC is switched from OFF state to ON state, the CPU 42 performs a scan performing process.

In S60, the CPU 42 monitors whether a predetermined notification has been received from the NFC I/F 30. As described above, when receiving the Polling signal, which is a request signal for establishing an NFC session, from the portable terminal PT (YES in S20 of FIG. 2), the processor 32 of the NFC I/F 30 provides the predetermined notification to the controller 40 (i.e., the CPU 42) (see S22 of FIG. 2). Then, an NFC session between the NFC I/F 30 of the scanner SC and the NFC I/F 70 of the portable terminal PT is established (S24 of FIG. 2). In this case, the CPU 42 judges YES in S60, and proceeds to S62.

In S62, the CPU 42 judges whether the operating state of the scanner SC is the G/O state. In case of judging that the operating state of the scanner SC is the G/O state (YES in S62), the CPU 42 skips S64 and proceeds to S66, and in case of judging that the operating state of the scanner SC is device state (NO in S62), the CPU 42 proceeds to S64. Here, device state is a state in which the scanner SC is not operating in either the G/O state or the CL state of the WFD scheme, and does not belong to a wireless network. Moreover, although not shown, in case of judging in S62 that the operating state of the scanner SC is the CL state, the CPU 42 returns to S60 without performing any of the processes of S64 to S88 of FIG. 4.

In S64, the CPU 42 changes the operating state of the scanner SC from the device state to the G/O state, forming a WFDNW in which the scanner SC is the G/O apparatus. The WFDNW is a wireless network to be used by the wireless profile WP (see S40 of FIG. 3) currently stored in the main memory 44. At the time that the WFDNW is formed in S64, only the scanner SC, which is the G/O apparatus, belongs to the WFDNW, and not even one CL apparatus belongs to the WFDNW. Consequently, not even one piece of CL information is being described in the management list ML in the main memory 44. When S64 ends, the process proceeds to S66.

In S66, the CPU 42 monitors whether a connection request has been received from the portable terminal PT via the wireless LAN I/F 20. The connection request is a Probe Request, and includes the SSID in the wireless profile WP currently stored in the main memory 44. The connection request is a request received in the situation of the scanner SC being a G/O apparatus, i.e., a situation of the WFDNW being formed. In the case where the connection request has been received from the portable terminal PT, the CPU 42 judges YES in S66, and proceeds to S68.

In S68, the CPU 42 establishes a Wi-Fi connection with the portable terminal PT which is the sending source of the connection request. Specifically, the CPU 42 sends a response signal (i.e., Probe Response) in response to the connection request to the portable terminal PT via the wireless LAN I/F 20. Further, the CPU 42 performs communication, via the wireless LAN I/F 20, of a Provision Discovery Request/Response, Association Request/Response, Authentication Request/Response, 4-Way Handshake, etc. During this process, the information (e.g., authentication scheme, encryption scheme, password, etc.) included in the wireless profile WP is sent to the scanner SC from the portable terminal PT, and the CPU 42 performs authentication of the portable terminal PT by using the information. In the case where the authentication of the portable terminal PT succeeds, the CPU 42 establishes a Wi-Fi connection with the portable terminal PT via the wireless LAN I/F 20. Thereby, the CPU 42 can cause the portable terminal PT to belong, as a CL apparatus, to the WFDNW in which the scanner SC is the G/O apparatus. In the case where the Wi-Fi connection with the portable terminal PT has been established, the CPU 42 describes the CL information, which includes the MAC address of the portable terminal PT, in the management list ML in the main memory 44.

Next, in S70, the CPU 42 monitors whether a status confirmation request (see S118 of FIG. 5, to be described) has been received from the portable terminal PT. The status confirmation request is a request for requesting the document status DS to be sent, in order to perform a final confirmation of the document status DS, before the portable terminal PT causes the scanner SC to perform the scanning Upon receiving the status confirmation request from the portable terminal PT via the wireless LAN I/F 20 by using the WFDNW, the CPU 42 judges YES in S70, and proceeds to S72.

In S72, the CPU 42 reads the document status DS being stored in the main memory 44 at that time, and sends the read document status DS to the portable terminal PT via the wireless LAN I/F 20 by using the WFDNW.

Next, in S80, the CPU 42 monitors whether a scan performing instruction (see S124 of FIG. 5, to be described) has been received from the portable terminal PT. The scan performing instruction is an instruction for the portable terminal PT to instruct the scanner SC to perform a scan. Upon receiving the scan performing instruction from the portable terminal PT via the wireless LAN I/F 20 by using the WFDNW, the CPU 42 judges YES in S80, and proceeds to S82. Moreover, in S66, S70 and S80, in a case where a predetermined timeout period has elapsed without receiving the respective connection request, status confirmation request, or the scan performing instruction from the portable terminal PT, the CPU 42 returns to S60 without performing the subsequent processes.

In S82, the CPU 42 causes the scan performing unit 16 to scan the document. The CPU 42 creates image data based on a scan result acquired from the scan performing unit 16. Further, the CPU 42 sends the created image data to the portable terminal PT via the wireless LAN I/F 20 by using the WFDNW.

Next, in S84, the CPU 42 changes the operating state of the scanner SC from the G/O state to the device state. Thereby, the WFDNW formed in S64 disappears. As a result, the Wi-Fi connection with the portable terminal PT is disconnected. The CPU 42 deletes the CL information of the portable terminal PT described in S64 from the management list ML in the main memory 44.

Next, in S86, the CPU 42 prepares the wireless profile WP. Further, the CPU 42 detects the document status DS. Next, in S88, the storing instruction including the wireless profile WP prepared in S86, and the document status DS detected in S86 is provided to the NFC I/F 30. S86 and S88 are the same as S40 and S42 of FIG. 3. As described above, in S40 the CPU 42 prepares the SSID and the password by randomly selecting character strings. This point is the same in S86. Consequently, the SSID and password prepared in S86 are usually different from the SSID and password prepared in S40. Further, the SSID and password prepared in S86 this time are usually different from the SSID and password prepared in S86 last time. Thus, the CPU 42 can prepare a unique wireless profile WP which has not been used in the past. Further, when the scanning is performed in S82, the document set on the ADF is fed to the scan performing unit 16, and therefore the state shifts to a state of a document not being set on the ADF. Consequently, the document status DS immediately after performing a scan usually indicates "Absent". When S88 ends, the process returns to S60.

(Main Process of CPU 82 of Controller 80 of Portable Terminal PT; FIG. 5)

A main process performed by the CPU 82 of the controller 80 of the portable terminal PT will be described with reference to FIG. 5. When the power of the portable terminal PT is switched from OFF state to ON state, the CPU 82 performs the main process. Although not shown, when the main process is started, the CPU 82 sends a Polling signal every predetermined period via the NFC I/F 70.

In S102, the CPU 82 monitors whether the scanner information has been acquired from the NFC I/F 70. As described above, when the processor 32 of the NFC I/F 30 of the scanner SC receives the Polling signal from the portable terminal PT, an NFC session is then established between the NFC I/F 30 of the scanner SC and the NFC I/F 70 of the portable terminal PT (see S24 of FIG. 2). As described above, the NFC I/F 70 is operating in Reader mode. Consequently, by using the NFC session, the NFC I/F 70 reads the scanner information stored in the I/F memory 34 of the NFC I/F 30 (i.e., receives from the NFC I/F 30). Next, the CPU 82 acquires the scanner information from the NFC I/F 70. In this case, the CPU 82 judges YES in S102, and proceeds to S104.

In S104, the CPU 82 judges whether the application APL (see FIG. 1) has been activated. In the case where the application APL has already been activated, the CPU 82 judges YES in S104, skips S106, and proceeds to S108. On the other hand, in the case where the application APL has not been activated, the CPU 82 judges NO in S104, and proceeds to S106. In S106, the CPU 82 activates the application APL in accordance with the application activate instruction AAI included in the acquired scanner information. Then, the process proceeds to S108.

In S108, the CPU 82 sends a connection request (see S66 of FIG. 4) to the scanner SC via the wireless LAN I/F 60. In S110, next, the CPU 82 establishes a Wi-Fi connection with the scanner SC. Since the method of establishing the Wi-Fi connection between the scanner SC and the portable terminal PT is as described above, a detailed description is omitted.

Next, in S112, the CPU 82 judges whether the document status DS included in the acquired scanner information indicates "Present". In the case where the document status DS indicates "Present", the CPU 82 judges YES in S112, and proceeds to S118. On the other hand, in the case where the document status DS indicates "Absent" or "Left", the CPU 82 judges NO in S112, and proceeds to S114.

In S114, the CPU 82 causes the display unit 54 to display a selection screen. The selection screen is a screen for causing the user to select whether scanning by the scanner SC is to be continued. Although not shown, the selection screen includes a message indicating that a scan target document has not been set on the scanner SC (i.e., the case of document status DS "Absent"), or a message indicating that a predetermined period has elapsed since the scan target document was set on the scanner SC (i.e., the case of document status DS "Left"). In a modification, the selection screen may include an error message having the same contents in the case of document status DS "Absent" and the case of document status DS "Left". Further, the selection screen includes a continue button for the user to select continuing the scan, and a stop button for the user to select stopping the scan.

In S116, it is judged whether continuing the scan has been selected by the user in the selection screen displayed in S114. In case the user has operated the continue button in the selection screen, the CPU 82 judges YES in S116, and proceeds to S118. On the other hand, in case the user has operated the stop button in the selection screen, the CPU 82 judges NO in S116, and returns to S102. In this case, although not shown, the CPU 82 sends a Disconnect signal to the scanner SC, and disconnects the Wi-Fi connection.

In S118, the CPU 82 sends a status confirmation request to the scanner SC (S70 of FIG. 4) via the wireless LAN I/F 60 by using the WFDNW. The status confirmation request is as described above. Next, in S120, the CPU 82 monitors whether the document status DS has been received from the scanner SC via the wireless LAN I/F 60. Upon receiving the document status DS from the scanner SC, the CPU 82 judges YES in S120, and proceeds to S122.

In S122, the CPU 82 judges whether the received document status DS indicates "Absent". In the case where the document status DS is "Absent" (i.e., the case where a document has not been set on the scanner SC), the CPU 82 judges YES in S122, and returns to S114. On the other hand, in the case where the document status DS indicates "Present" or "Left", the CPU 82 judges NO in S122, and proceeds to S124.

In S124, the CPU 82 sends the scan performing instruction (see S80 of FIG. 4) to the scanner SC via the wireless LAN I/F 60 by using the WFDNW. Next, in S126, the CPU 82 monitors whether image data has been received from the scanner SC. As described above, when the scan performing instruction has been received from the portable terminal PT, the CPU 42 of the scanner SC causes the scan performing unit 16 to perform scanning of the document, creates image data based on the scan result, and sends the created image data to the portable terminal PT (see S82 of FIG. 4). Upon receiving the image data from the scanner SC via the wireless LAN OF 60 by using the WFDNW, the CPU 82 judges YES in S126, and proceeds to S128. Moreover, in the case where a predetermined timeout period has elapsed without receiving, respectively, the document status DS and the image data from the scanner SC in S120 and S126, the CPU 82 returns to S102 without performing the subsequent processes.

In S128, the CPU 82 disconnects the Wi-Fi connection with the scanner SC. Specifically, as described above, the WFDNW disappears as a result of the operating state of the scanner SC changing from the G/O state to the device state, and consequently the Wi-Fi connection between the scanner SC and the portable terminal PT is disconnected. When S128 ends, the process returns to S102.

(Specific Cases)

Next, specific cases A1 to A3 realized by the flowcharts of FIG. 2 to FIG. 5 will be described with reference to FIG. 6 to FIG. 8.

(Case A1; FIG. 6)

Case A1 shows a case of the portable terminal PT being brought closer to the scanner SC which is in a state of having a document set thereon. When the power of the scanner SC is switched from OFF state to ON state, the controller 40 prepares a wireless profile WP1 (S40 of FIG. 3). Further, since a document has not been set on the scanner SC at this point, the controller 40 detects the document status DS "Absent" (S40 of FIG. 3). The scanner SC, immediately after the power has been switched to ON state, is operating in the device state. The controller 40 provides, to the NFC I/F 30, the storing instruction 100 including the wireless profile WP1, the document status DS "Absent", the application activate instruction AAI and the device information DI (S42). As a result, the wireless profile WP1, the document status DS "Absent", the application activate instruction AAI and the device information DI are written to the I/F memory 34 (S12 of FIG. 2).

The user of the portable terminal PT sets the document on the ADF of the scanner SC. Thereby, the document status DS of the scanner SC changes from "Absent" to "Present" (YES in S44 of FIG. 3). Consequently, the controller 40 provides the storing instruction 102 including the document status DS "Present" to the NFC I/F 30 (S50 of FIG. 3). As a result, the document status DS "Present" is written to the I/F memory 34 (S12 of FIG. 2).

After activating the application APL, the user of the portable terminal PT brings the portable terminal PT close to the scanner SC. Thereby, the distance between devices of the NFC I/F 30 of the scanner SC and the NFC I/F 70 of the portable terminal PT changes from a situation of being greater than the predetermined distance (e.g., 10 cm) to a situation of being equal to or less than the predetermined distance. As a result, the NFC I/F 30 of the scanner SC receives a Polling signal 110 from the portable terminal PT (YES in S20 of FIG. 2), and provides a predetermined notification 110A to the controller 40 (S22). Upon acquiring the predetermined notification 110A, the controller 40 changes the operating state of the scanner SC from the device state to the G/O state (NO in S62, S64 of FIG. 4). The controller 40 forms the WFDNW in which the scanner SC operates as the G/O apparatus.

Further, the NFC I/F 30 of the scanner SC sends a response signal 112 in response to the Polling signal 110 to the portable terminal PT (S24 of FIG. 2). As a result, an NFC session between the NFC I/F 30 of the scanner SC and the NFC I/F 70 of the portable terminal PT is established. Then, using the NFC session, the NFC I/F 30 sends scanner information 114 being stored in the I/F memory 34 at this time (i.e., the wireless profile WP1, the document status DS "Present", the application activate instruction AAI and the device information DI) to the portable terminal PT (S30 of FIG. 2).

Upon receiving the scanner information 114 (YES in S102 of FIG. 5), the portable terminal PT sends a connection request 116 to the scanner SC via the wireless LAN I/F 60 (S108). The connection request 116 includes the SSID in the wireless profile WP1 included in the scanner information 114.

The controller 40 of the scanner SC receives the connection request 116 from the portable terminal PT via the wireless LAN I/F 20 (YES in S66 of FIG. 4). Then, the controller 40 establishes a Wi-Fi connection with the portable terminal PT, and causes the portable terminal PT to participate as a CL apparatus in the WFDNW.

Since the document status DS included in the received scanner information 114 indicates "Present" (YES in S112 of FIG. 5), the portable terminal PT sends a status confirmation request 118 via the wireless LAN I/F 60 (S118).

The controller 40 of the scanner SC receives the status confirmation request 118 from the portable terminal PT via the wireless LAN I/F 20 (YES in S70 of FIG. 4). The controller 40 sends the document status DS "Present" to the portable terminal PT via the wireless LAN I/F 20 (S72).

Upon receiving the document status DS "Present" (YES in S122 of FIG. 5), the portable terminal PT sends a scan performing instruction 120 to the scanner SC via the wireless LAN I/F 60 (S124).

The controller 40 of the scanner SC receives the scan performing instruction 120 from the portable terminal PT via the wireless LAN I/F 20 (YES in S80 of FIG. 4). Next, the controller 40 causes the scan performing unit 16 to perform a scan of the document (S82). The controller 40 creates image data 122 based on the scan result acquired from the scan performing unit 16 (S82). Further, the controller 40 sends the created image data 122 to the portable terminal PT via the wireless LAN I/F 20 (S82). The portable terminal PT receives the image data 122.

The controller 40 of the scanner SC changes the operating state of the scanner SC from the G/O state to the device state. As a result, the Wi-Fi connection between the scanner SC and the portable terminal PT is disconnected. Further, the controller 40 prepares a wireless profile WP2 different from the wireless profile WP1 (S86 of FIG. 4). Further, due to the scan having been performed, the ADF shifts to a state of a document not being set. Consequently, the controller 40 detects the document status DS "Absent" (S86). The controller 40 provides a storing instruction 124 including the wireless profile WP2 and the document status DS "Absent" to the NFC I/F 30. As a result, the wireless profile WP2 and the document status DS "Absent" is written to the I/F memory 34 (S12 of FIG. 2).

(Effect of Case A1)

As described above, in the present embodiment, in the case of establishing an NFC session with the portable terminal PT in a state of the document status "Present", the scanner SC can perform a scan, after the NFC session using the NFC I/F 30 has been established, without the user giving an instruction for starting the scan to the scanner SC and the portable terminal PT. That is, according to the present embodiment, the scanner SC can appropriately perform a scan even if the user does not give an instruction to the scanner SC and the portable terminal PT.

(Case A2; FIG. 7)

Case A2 shows a case in which the portable terminal PT is brought closer to the scanner SC which is in a state of not having a document set thereon. In case A2, also, processes from the power of the scanner SC being switched from OFF state to ON state until the wireless profile WP1 and the document status DS "Absent" are written into the I/F memory 34 (S12 of FIG. 2) are in common with case A1 described above (see FIG. 6), and consequently a description thereof is omitted.

After activating the application APL, the user of the portable terminal PT brings the portable terminal PT close to the scanner SC. The processes from the NFC I/F 30 of the scanner SC receiving the Polling signal 110 until establishment of the Wi-Fi connection between the scanner SC and the portable terminal PT are in common with case A1 (FIG. 6). However, in case A2, the document status DS included in the scanner information 114 indicating "Absent" is a point differing from case A1.

Since the document status DS included in the received scanner information 114 indicates "Absent" (NO in S112 of FIG. 5), the portable terminal PT causes the display unit 54 to display the selection screen (S114).

By looking at the selection screen, the user of the portable terminal PT can know that a document has not been set on the ADF of the scanner SC. The user sets the document on the ADF of the scanner SC. Thereby, the document status DS of the scanner SC changes from "Absent" to "Present" (YES in S44 of FIG. 3). Consequently, the controller 40 provides a storing instruction 140 including the document status DS "Present" to the NFC I/F 30 (S50 of FIG. 3).

Next, the user of the portable terminal PT selects Scan Continue in the selection screen (i.e., operates the continue button) (YES in S116 of FIG. 5). The portable terminal PT sends a status confirmation request 150 to the scanner SC via the wireless LAN OF 60 (S118).

The controller 40 of the scanner SC receives the status confirmation request 150 via the wireless LAN I/F 20 (YES in S70 of FIG. 4). The controller 40 sends the document status DS "Present" to the portable terminal PT via the wireless LAN I/F 20 (S72).

Upon receiving the document status DS "Present" (NO in S122 of FIG. 5), the portable terminal PT sends the scan performing instruction 120 to the scanner SC via the wireless LAN OF 60 (S124).

Each subsequent process is the same as case A1, and consequently a detailed description is omitted.

(Effect of Case A2)

As described above, in the present embodiment, in the case where the document status DS indicates "Absent", also, the scanner SC sends the scanner information 114 which includes the wireless profile WP1 to the portable terminal PT. Consequently, in the case where the document status DS indicates "Absent", also, the Wi-Fi connection between the scanner SC and the portable terminal PT is established. However, in the present embodiment, in the case where the document status DS indicates "Absent", the portable terminal PT does not send a scan performing instruction to the scanner SC. Therefore, in the case where the document status DS indicates "Absent", the scanner SC does not perform a scan. Consequently, in the present embodiment, the scanner SC can be switched appropriately to whether or not to perform a scan in response to the document status DS indicating "Absent" or "Present".

Further, in the present embodiment, in the case where the document status DS indicates "Absent", the portable terminal PT sends a status confirmation request to the scanner SC (S 118) on the condition that the user has selected continuing the scan in the selection screen (YES in S116 of FIG. 5). In the case where the document status DS received after sending of the status confirmation request is "Present" (NO in S122), the portable terminal PT sends the scan performing instruction to the scanner SC (S124). Consequently, in the present embodiment, even in the case where the document status DS indicates "Absent", the scanner SC can afterwards perform a scan in the case where the predetermined condition is satisfied.

(Case A3)

Case A3 is a case in which the portable terminal PT is brought closer to the scanner SC after a predetermined period elapsed since a document was set. In case A3, also, processes from the power of the scanner SC being switched from OFF state to ON state until the writing of the wireless profile WP1 and the document status DS "Absent" into the I/F memory 34 (S12 of FIG. 2) are in common with case A1 described above (see FIG. 6), and consequently a description thereof is omitted. In case A3, the user of the portable terminal PT sets the document on the ADF of the scanner SC. Thereby, the document status DS of the scanner SC changes from "Absent" to "Present" (YES in S44 of FIG. 3). Consequently, the controller 40 provides the storing instruction 102 including the document status DS "Present" to the NFC I/F 30 (S52 of FIG. 3). As a result, the document status DS "Present" is written to the I/F memory 34 (S12 of FIG. 2).

In case A3, a predetermined period (e.g., 10 minutes) then elapses in a state of the document status DS "Present" without scanning being performed (YES in S48 of FIG. 3). The controller 40 provides a storing instruction 145 including the document status DS "Left" to the NFC I/F 30 (S54 of FIG. 3). As a result, the document status DS "Left" is written to the I/F memory 34 (S12 of FIG. 2).

After activating the application APL, the user of the portable terminal PT brings the portable terminal PT close to the scanner SC. The processes from the NFC I/F 30 of the scanner SC receiving the Polling signal 110 until establishment of the Wi-Fi connection between the scanner SC and the portable terminal PT are in common with case A1 (FIG. 6) and A2 (FIG. 7). However, in case A3, the document status DS included in the scanner information 114 indicating "Left" is a point differing from cases A1 and A2.

Since the document status DS included in the received scanner information 114 indicates "Left" (NO in S112 of FIG. 5), the portable terminal PT causes the display unit 54 to display the selection screen (S114).

By looking at the selection screen, the user of the portable terminal PT can know that the predetermined period has elapsed since the document was set on the ADF of the scanner SC.

The user of the portable terminal PT selects Scan Continue in the selection screen (i.e., operates the continue button) (YES in S116 of FIG. 5). The portable terminal PT sends the status confirmation request 150 to the scanner SC via the wireless LAN I/F 60 (S118).

The controller 40 of the scanner SC receives the status confirmation request 150 via the wireless LAN I/F 20 (YES in S70 of FIG. 4). The controller 40 sends the document status DS "Left" to the portable terminal PT via the wireless LAN I/F 20 (S72).

Upon receiving the document status DS "Left" (NO in S122 of FIG. 5), the portable terminal PT sends the scan performing instruction 120 to the scanner SC via the wireless LAN I/F 60 (S124).

Each subsequent process is the same as case A1, and consequently detailed descriptions are omitted.

(Effect of Case A3)

As described above, in the present embodiment, in the case where the document status DS indicates "Left", the scanner SC performs a scan on the condition that the user has selected continuing the scan in the selection screen displayed on the display unit 54 of the portable terminal PT (YES in S116 of FIG. 5). Consequently, in the present embodiment, even in the case where the document status DS indicates "Left", the scanner SC can afterwards perform a scan in the case where the predetermined condition is satisfied.

(Storing Contents of I/F Memory 34 in Each Setting Situation of Document with Respect to Scanner SC; FIG. 9)

The storing contents (i.e., the scanner information) of the I/F memory 34 in each setting situation of document with respect to the scanner SC in the present embodiment will be described together with reference to FIG. 9. In a situation in which a document has not been set on the ADF of the scanner SC, the wireless profile WP, the document status DS "Absent", the application activate instruction AAI and the device information DI are stored in the I/F memory 34. In a situation in which a document has been set on the ADF of the scanner SC, and the predetermined period has not elapsed since the document was set, the wireless profile WP, the document status DS "Present", the application activate instruction AAI and the device information DI are stored in the I/F memory 34. In a situation in which a document has been set on the ADF of the scanner SC, and the predetermined period has elapsed since the document was set, the wireless profile WP, the document status DS "Left", the application activate instruction AAI and the device information DI are stored in the I/F memory 34.

(Correspondence Relationship)

The scanner SC and the portable terminal PT are examples of "a function performing apparatus" and "a communication apparatus", respectively. The NFC scheme and the WFD scheme are examples of "a first scheme" and "a second scheme", respectively. The NFC I/F 30 and the wireless LAN I/F 20 are examples of "a first interface" and "a second interface", respectively. The sensor 18 is an example of "a sensor". The NFC session is an example of "a communication session". The WFDNW is an example of "a wireless network". The wireless profile WP is an example of "network information". The state in which a document has been set on the ADF of the scanner SC, and the state in which a document has not been set are examples of "a placed state" and "a non-placed state", respectively. The operation of selecting Scan Continue in the selection screen is an example of "a predetermined instruction". The document status DS "Absent" is an example of "non-placed related information". The document status DS "Present" and the document status DS "Left" are examples of "placed related information". The document status DS "Present" is an example of "a first type of placed related information". The document status DS "Left" is an example of "a second type of placed related information".

The processing of S40, S44 and S46 of FIG. 3 are examples of "judging". S82 of FIG. 4 are examples of processes performed by "causing the scan performing unit to perform the scanning", "creating", and "sending the created image data". S50 of FIG. 3 is an example of a process performed by "providing non-placed related information". S52, S54 of FIG. 3 are examples of processes performed by "providing placed related". S42 of FIG. 3 is an example of a process performed by "causing the interface memory to store".

Further, the NFC I/F 70 and the wireless LAN I/F 60 are examples of "a first interface" and "a second interface", respectively. The document status DS is an example of "related information". The selection screen displayed on the display unit 54 in the case of document status DS "Absent" (S114 of FIG. 5), and the selection screen displayed on the display unit 54 in the case of document status DS "Left" (S114) are examples of "a first selection screen" and "a second selection screen", respectively.

The case of YES in S102 of FIG. 5 is an example of "receiving . . . network information" and "receiving related information related to a state of the function performing apparatus". S124 is an example of "sending a scan performing instruction". The case of YES in S126 is an example of "receiving image data". S114 in the case of document status DS "Absent" is an example of "causing . . . a display unit of the communication apparatus to display a first selection screen". S114 in the case of document status DS "Left" is an example of "causing . . . a display unit of the communication apparatus to display a second selection screen". S118 is an example of "sending a confirmation request". The case of YES in S120 is an example of "re-receiving the related information".

Second Embodiment

For the second embodiment, points different from the first embodiment will mainly be described. In the present embodiment, a part (more specifically, information stored in the I/F memory 34) of the contents of the main process of the CPU 42 of the controller 40 of the scanner SC is different from the first embodiment (see FIG. 3). Further, in the present embodiment, a part of the contents of the main process of the CPU 82 of the controller 80 of the portable terminal PT is also different from the first embodiment (see FIG. 5).

(Main Process of CPU 42 of Controller 40 of Scanner SC; FIG. 3)

The contents of the process of S40 is the same as the first embodiment. In the present embodiment, in the case where the document status DS detected in S40 indicates "Present", in S42 the CPU 42 provides, to the NFC I/F 30, the storing instruction including the wireless profile WP prepared in S40, the document status DS "Present" detected in S40, the application activate instruction AAI, and the device information DI. Thereby, the processor 32 of the NFC I/F 30 writes, to the I/F memory 34, the wireless profile WP, the document status DS "Present", the application activate instruction AAI, and the device information DI included in the storing instruction (see S12 of FIG. 2). On the other hand, in the case where the document status DS detected in S40 is "Absent", in S42 the CPU 42 provides, to the NFC I/F 30, a storing instruction including a browser activate instruction and a URL (abbreviation of Uniform Resource Locator). Here, the browser activate instruction is an instruction for activating a browser application installed on the portable terminal PT. The URL is information for causing the display unit 54 of the portable terminal PT to display a predetermined message screen. The predetermined message screen includes a predetermined error message. Thereby, in the case where the document status DS detected in S40 is "Absent", the processor 32 of the NFC I/F 30 writes the browser activate instruction and the URL included in the storing instruction to the I/F memory 34 (see S12 of FIG. 2).

The monitoring steps of S44, S46, and S48 are also the same as the first embodiment. However, in S50, the CPU 42 provides the storing instruction including the browser activate instruction and the URL to the NFC I/F 30. Further, in S52, the CPU 42 provides, to the NFC I/F 30, the storing instruction including the wireless profile WP prepared in S40, the document status DS "Present", the application activate instruction AAI, and the device information DI. Further, in S54, the CPU 42 provides, to the NFC I/F 30, the storing instruction including the browser activate instruction and the URL. Moreover, in a modification, the URL provided to the NFC I/F 30 in S50, and the URL provided to the NFC I/F 30 in S54 may be different.

(Main Process of CPU 82 of Controller 80 of Portable Terminal PT; FIG. 5)

In the present embodiment, in the case where the CPU 82 acquired the scanner information from the NFC I/F 70 (YES in S102), the process proceeds to S130. In S130, the CPU 42 judges whether the acquired scanner information includes the browser activate instruction and the URL. In the case where the scanner information includes the browser activate instruction and the URL, the CPU 82 judges YES in S130, and proceeds to S132. In S132, the CPU 82 activates the browser application in accordance with the browser activate instruction, and causes the display unit 54 to display a message screen indicated by the URL. By looking at the message screen, the user of the portable terminal PT can know that a scan cannot be performed at present. When S132 ends, the process returns to S102. On the other hand, in the case where the scanner information does not include the browser activate instruction and the URL (i.e., the scanner information includes the wireless profile WP, the document status DS "Present", the application activate instruction AAI and the device information DI), the CPU 82 judges NO in S130, and proceeds to S104. The processes from S104 onward are the same as the first embodiment.

(Case B; FIG. 10)

Next, a specific case B realized by the present embodiment will be described with reference to FIG. 10. Case B shows a case in which, in the present embodiment, the portable terminal PT is brought closer to the scanner SC, which is in a state of not having a document set thereon. As shown in FIG. 10, at the time of switching the power of the scanner SC from OFF state to ON state, a document has not been set on the scanner SC. Consequently, the controller 40 detects the document status DS "Absent" (S40 of FIG. 3). The controller 40 provides a storing instruction 200 including the browser activate instruction and the URL to the NFC I/F 30 (S42 of FIG. 3). As a result, the browser activate instruction and the URL are written to the I/F memory 34 (S12 of FIG. 2).

After activating the application APL, the user of the portable terminal PT brings the portable terminal PT close to the scanner SC. The NFC I/F 30 of the scanner SC receives the Polling signal 110 from the portable terminal PT (YES in S20 of FIG. 2), and provides the predetermined notification 110A to the controller 40 (S22). Upon acquiring the predetermined notification 110A, the controller 40 changes the operating state of the scanner SC from the device state to the G/O state (NO in S62, S64 of FIG. 4). Moreover, in a modification, when acquiring the predetermined notification 110A in a situation in which the document status DS "Absent" is being stored in the main memory 44, the controller 40 may maintain the operating state of the scanner SC in the device state, and not change to the G/O state.

Further, the NFC I/F 30 of the scanner SC sends the response signal 112 to the portable terminal PT in response to the Polling signal 110 (S24 of FIG. 2). As a result, an NFC session between the NFC I/F 30 of the scanner SC and the NFC I/F 70 of the portable terminal PT is established. Then, by using the NFC session, the NFC I/F 30 sends scanner information 214 (i.e., the browser activate instruction and the URL) stored in the I/F memory 34 at this point to the portable terminal PT (S30 of FIG. 2).

Upon receiving the scanner information 214 (YES in S102 of FIG. 5, YES in S130), the portable terminal PT activates the browser application in accordance with the browser activate instruction included in the scanner information 214, and causes the display unit 54 to display the message screen indicated by the URL (S132).

In this case, the controller 40 of the scanner SC does not receive a connection request from the portable terminal PT after the operating state of the scanner SC has changed from the device state to the G/O state (NO in S66 of FIG. 4). Consequently, after a predetermined timeout period has elapsed, the controller 40 returns the operating state of the scanner SC from the G/O state to the device state.

In the present embodiment, even in a case where the portable terminal PT is brought closer to the scanner SC after the predetermined period has elapsed since the document was set (i.e., the document status "Left"), the same processing as case B described above is performed. Moreover, in a modification, a message screen displayed by the portable terminal PT may be different when the document status is "Absent" and when the document status is "Left".

(Stored Contents of I/F Memory 34 in Each Setting Situation of Document with Respect to Scanner SC; FIG. 11)

The stored contents (i.e., the scanner information) of the I/F memory 34 in each setting situation of the document with respect to the scanner SC in the present embodiment will be described together with reference to FIG. 11. In the situation in which a document has not been set on the ADF of the scanner SC, the browser activate instruction and the URL are stored in the I/F memory 34. In the situation in which a document has been set on the ADF of the scanner SC, and the predetermined period has not elapsed since the document was set, the wireless profile WP, the document status DS "Present", the application activate instruction AAI and the device information DI are stored in the I/F memory 34. In the situation in which a document has been set on the ADF of the scanner SC, and the predetermined period has elapsed since the document was set, the browser activate instruction and the URL are stored in the I/F memory 34.

(Effects of Present Embodiment)

In the present embodiment, in the case where the document status DS indicates "Present", scanner information including the wireless profile WP is stored in the I/F memory 34, and in the case where the document status DS indicates "Absent" or "Left", scanner information including the browser activate instruction and the URL is stored in the I/F memory 34. Consequently, in the case where the document status DS indicates "Present", the Wi-Fi connection between the scanner SC and the portable terminal PT is established, and a scan can be performed. On the other hand, in the case where the document status DS indicates "Absent" or "Left", the Wi-Fi connection is not established, nor is scanning performed. Consequently, in the present embodiment, also, the scanner SC can be switched appropriately to whether or not to perform a scan in response to the document status DS. Further, in the present embodiment, the scanner SC can also be switched appropriately to whether or not to establish the Wi-Fi connection between the scanner SC and the portable terminal PT in response to the document status DS.

(Correspondence Relationship)

The browser activate instruction and the URL are examples of "non-placed related information". The URL is an example of "display information". The message screen is an example of "an informing screen". S42 of FIG. 3 (in the case of the document status DS "Absent"), is an example of a process when S50 "providing non-placed related information" is performed. S42 of FIG. 3 (in the case of the document status DS "Present"), is an example of a process when S52 "providing placed related information" and "causing the interface memory to store" is performed.

Third Embodiment

For the third embodiment, points different from the first embodiment will mainly be described. In the present embodiment, as shown in FIG. 1, the point differs from the first embodiment in that the function performing apparatus included in the function performing system 2 is not the scanner SC, but is a multiple function peripheral MFP. The multiple function peripheral MFP is a peripheral apparatus capable of performing multiple functions such as a print function, scan function, etc. The configuration of the multiple function peripheral MFP is almost the same as that of the scanner SC of the first embodiment, but differs on the point of comprising the print performing unit 90. The print performing unit 90 is a printing mechanism such as an ink jet scheme, a laser scheme, etc. In the present embodiment, as shown in FIG. 12, a function performing process of the CPU 42 of the controller 40 of the multiple function peripheral MFP partially differs from the scan performing process of the first embodiment (see FIG. 4). Further, as shown in FIG. 13, the main process of the CPU 82 of the controller 80 of the portable terminal PT also partially differs from the main process of the first embodiment (see FIG. 5). Moreover, the process of the processor of the NFC I/F 30 of the multiple function peripheral MFP (see FIG. 2), and the main process of the CPU 42 of the controller 40 (see FIG. 3) are the same as the processes of FIG. 2, FIG. 3, respectively, of the first embodiment.

(Function Performing Process of CPU 42 of Controller 40 of Multiple Function Peripheral MFP; FIG. 12)

S260 to S268 are the same as S60 to S68 of FIG. 4 except for the point that "scanner SC" is replaced by "multiple function peripheral MFP" (see S262, S264). In the present embodiment, after the Wi-Fi connection has been established in S268, the monitoring steps of S269, S270 are performed.

In S269, the CPU 42 monitors whether a print performing instruction and target data have been received from the portable terminal PT. The print performing instruction is an instruction for causing the multiple function peripheral MFP to perform a print. The target data is data that is a target of printing. Upon receiving the print performing instruction and the target data from the portable terminal PT via the wireless LAN I/F 20 by using the WFDNW, the CPU 42 judges YES in S269, and proceeds to S269A. In S269A, the CPU 42 causes the print performing unit 90 to print an image represented by the target data. When S269A ends, the process proceeds to S284.

In S270, as in S70 of FIG. 4, the CPU 42 monitors whether a status confirmation request has been received from the portable terminal PT. Upon receiving the status confirmation request from the portable terminal PT via the wireless LAN I/F 20 by using the WFDNW, the CPU 42 judges YES in S270, and proceeds to S272. S272 to S288 are the same as S60 to S68 of FIG. 4 except for the point that "scanner SC" is replaced by "multiple function peripheral MFP" (see S284).

(Main Process of CPU 82 of Controller 80 of Portable Terminal PT; FIG. 13)

S302 to S310 are the same as S102 to S110 of FIG. 5 except for the point that "scanner information" is replaced by "multi-function peripheral information" (see S302). In the present embodiment, after establishment of the Wi-Fi connection in S310, in S311 the CPU 82 judges whether the user of the portable terminal PT has inputted a print instruction. In a case where the print instruction has been inputted at this time, the CPU 82 judges YES in S311 and, in S311A, sends to the multiple function peripheral MFP the print performing instruction and the target data designated by the user when the print instruction was inputted. Thereby, the multiple function peripheral MFP performs a print (see S269A of FIG. 12). When S311 ends, the process proceeds to S328. On the other hand, in a case where a print instruction has not been inputted at this time, the CPU 82 judges NO in S311, and proceeds to S312. S312 to S328 are the same as S112 to S128 of FIG. 5.

Figure 14:
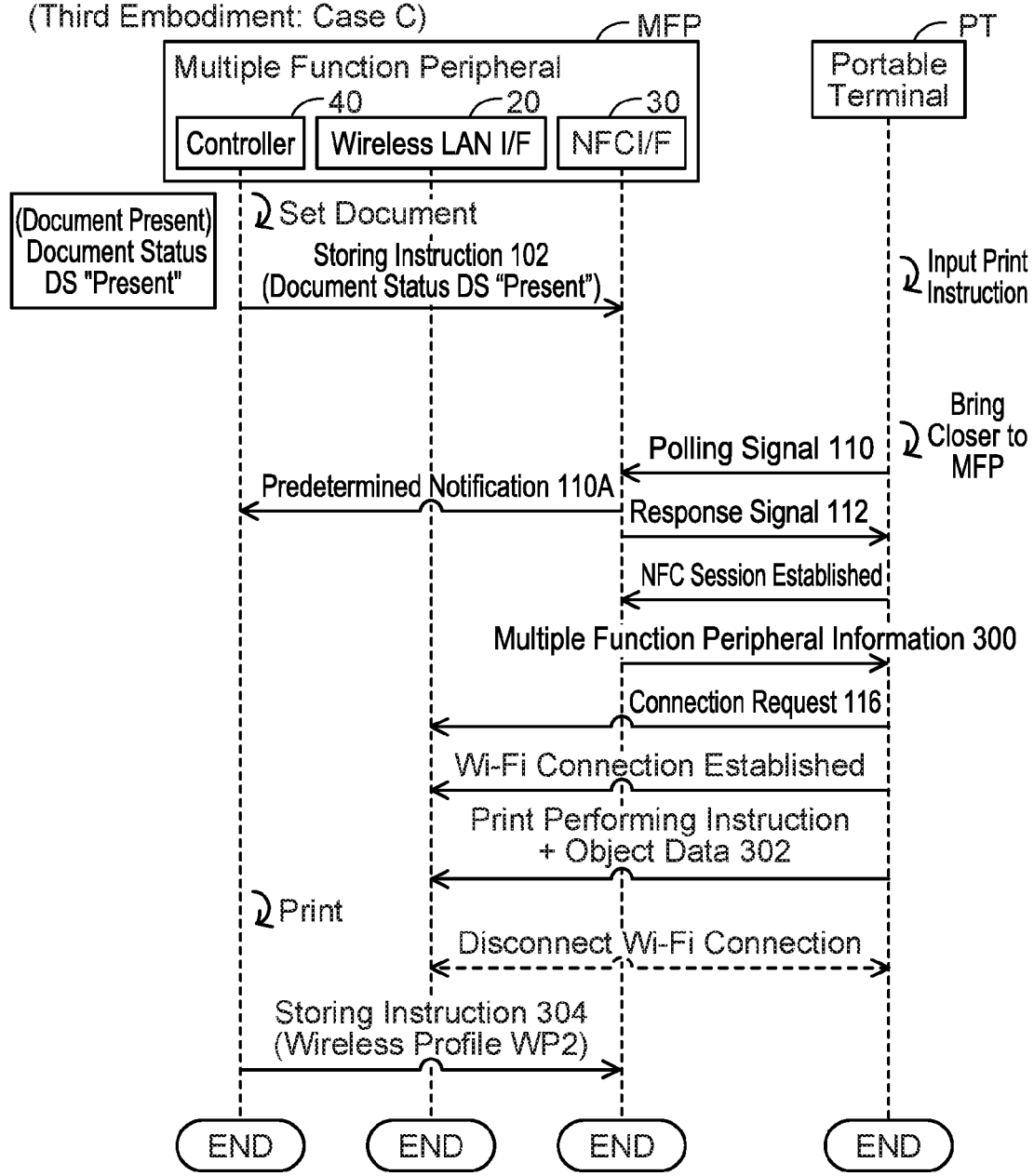
FIG. 14 shows a sequence diagram of a case C, in the third embodiment, in which the portable terminal to which a print instruction has been input, is brought closer to the multiple function peripheral.

(Case C; FIG. 14)

Case C shows a case in which a portable terminal to which the print instruction has been inputted is brought closer to the multiple function peripheral MFP. Processes from the power of the scanner SC being switched from OFF state to ON state until writing the wireless profile WP1 and the document status DS "Absent" into the I/F memory 34 (S12 of FIG. 2) are in common with case A1 of the first embodiment (see FIG. 6) and consequently a description thereof is omitted. In case C, the user (the user may be the same as or different from the user of the portable terminal PT) sets the document on the ADF of the scanner SC. Thereby, the document status DS of the scanner SC changes from "Absent" to "Present" (YES in S44 of FIG. 3). Consequently, the controller 40 provides the storing instruction 102 including the document status DS "Present" to the NFC I/F 30 (S52 of FIG. 3). As a result, the document status DS "Present" is written to the I/F memory 34 (S12 of FIG. 2).

On the other hand, after activating the application APL, the user of the portable terminal PT operates the operation unit 52 to input the print instruction. At this juncture, the user also designates the target data of the printing target. Then, the user of the portable terminal PT brings the portable terminal PT closer to the multiple function peripheral MFP. The NFC I/F 30 of the multiple function peripheral MFP receives the Polling signal 110 from the portable terminal PT (YES in S20 of FIG. 2), and provides the predetermined notification 110A to the controller 40 (S22). Upon acquiring the predetermined notification 110A, the controller 40 changes the operating state of the multiple function peripheral MFP from the device state to the G/O state (NO in S262, S264 of FIG. 12).

Further, the NFC I/F 30 of the multiple function peripheral MFP sends the response signal 112 to the portable terminal PT in response to the Polling signal 110 (S24 of FIG. 2). As a result, an NFC session is established between the NFC I/F 30 of the multiple function peripheral MFP and the NFC I/F 70 of the portable terminal PT. Then, by using the NFC session, the NFC I/F 30 sends multi-function peripheral information 300 (i.e., the wireless profile WP, the document status DS "Present", the application activate instruction AAI, and the device information DI) being stored in the I/F memory 34 at this point to the portable terminal PT (S30 of FIG. 2).

Upon receiving the multi-function peripheral information 300 (YES in S302 of FIG. 13), the portable terminal PT sends the connection request 116 to the multiple function peripheral MFP via the wireless LAN I/F 60 (S308).

The controller 40 of the multiple function peripheral MFP receives the connection request 116 from the portable terminal PT via the wireless LAN I/F 20 (YES in S266 of FIG. 12). Then, the controller 40 establishes the Wi-Fi connection with the portable terminal PT, and causes the portable terminal PT to belong to the WFDNW as a CL apparatus.

In Case C, the print instruction has already been inputted to the portable terminal PT (YES in S311 of FIG. 13). Consequently, the document status "Present" is included in the received multi-function peripheral information 300 but, regardless, the portable terminal PT sends the print performing instruction and target data 302 to the multiple function peripheral MFP via the wireless LAN I/F 60 by using the WFDNW (S311A).

The controller 40 of the multiple function peripheral MFP receives the print performing instruction and the target data 302 from the portable terminal PT via the wireless LAN I/F 20 (YES in S269 of FIG. 12). The controller 40 causes the print performing unit 90 to print an image represented by the received target data (S269A). Then, the controller 40 changes the operating state of the scanner SC from the G/O state to the device state. As a result, the Wi-Fi connection between the scanner SC and the portable terminal PT is disconnected. Further, the controller 40 prepares the wireless profile WP2 that is different from the wireless profile WP1 (S286 of FIG. 12). Moreover, since in case C a scan is not performed, the document status DS is not changed. Consequently, the controller 40 provides a storing instruction 304 including only the wireless profile WP2 to the NFC I/F 30. As a result, the wireless profile WP2 is written to the I/F memory 34 (S12 of FIG. 2).

(Effect of Present Embodiment)

In the present embodiment, in the case where the print performing instruction and the target data are received (YES in S269 of FIG. 12), the multiple function peripheral MFP performs a print of an image represented by the target data even if the document status DS indicates "Present" (S269). Similarly, in the case of establishing an NFC session with the multiple function peripheral MFP after the user has inputted the print instruction (YES in S311 of FIG. 13), the portable terminal PT sends the print performing instruction to the multiple function peripheral MFP (S311A) regardless of whether the document status DS indicates "Present". Consequently, the multiple function peripheral MFP can perform a print of an image represented by the target data at a higher priority than performing a scan of the document.

(Correspondence Relationship)

The multiple function peripheral MFP is an example of "a function performing apparatus". The case of YES in S269 of FIG. 12 is an example of a process performed by "receiving a print performing instruction". S269A is an example of a process performed by "causing the print performing unit to perform a printing". Further, S311A of FIG. 13 is an example of "sending, . . . the print performing instruction".

Specific examples of the present invention are described above in detail, but these examples are merely illustrative and place no limitation on the scope of the patent claims. The technology described in the patent claims also encompasses various changes and modifications to the specific examples described above. Modifications of the above embodiment are listed below.

(Modification 1) In the embodiments described above, the controller 40 of the scanner SC (or the multiple function peripheral MFP) provides the document status DS to the NFC I/F 30. The I/F memory 34 stores the document status DS. The NFC I/F 30 sends the document status DS stored in the I/F memory 34 to the portable terminal by using the communication session. Instead, after having established a Wi-Fi connection with the portable terminal PT, the controller 40 may send the document status DS to the portable terminal PT via the wireless LAN I/F 20 by using the WFDNW.

(Modification 2) In the embodiments described above, the NFC I/F 30 of the scanner SC (or the multiple function peripheral MFP) is an NFC forum tag. The NFC I/F 30 of the scanner SC is not restricted thereto, and may be an NFC forum device. In the case where a communication session is established between the NFC I/F 30 of the scanner SC and the NFC I/F 70 of the portable terminal PT, a P2P communication may be performed between the scanner SC and the portable terminal PT. In this modification, the scanner information (i.e., the wireless profile WP, the document status DS, the application activate instruction AAI, and the device information DI) may be stored not in the I/F memory 34, but in the main memory 44. In the case where a communication session is established, the controller 40 of the scanner SC may send the scanner information stored in the main memory 44 to the portable terminal PT via the NFC I/F 30. This process, also, is an example of a process performed by "causing the interface memory to store".

(Modification 3) In the embodiments described above, the NFC I/F 30 of the scanner SC (or the multiple function peripheral MFP) is connected to a bus line, and is capable of communicating with the controller 40 via the bus line. The NFC I/F 30 is not restricted thereto, and may not be connected to a bus line and not be capable of being connected with the controller 40. In this modification, the wireless profile WP, the application activate instruction AAI and the device information DI among the scanner information may be stored in the I/F memory 34 as fixed information. Further, since the wireless profile WP is a fixed value stored in the I/F memory 34, the controller 40 may perform a Wi-Fi connection utilizing the same wireless profile WP, without preparing a new wireless profile WP in S40 of FIG. 3 and S80 of FIG. 4. Further, the operating state of the scanner SC may constantly be operation in the G/O state. Moreover, after having established the Wi-Fi connection with the portable terminal PT, the controller 40 may send the document status DS to the portable terminal PT via the wireless LAN I/F 20 by using the WFDNW.

(Modification 4) In the embodiments described above, after having established the Wi-Fi connection between the scanner SC (or the multiple function peripheral MFP) and the portable terminal PT, the controller 80 of the portable terminal PT may send a process capability confirmation request to the scanner SC via the wireless LAN I/F 60. Here, the process capability confirmation request is a request for requesting information to be sent which indicates the process capability of the scanner SC (e.g., ability to perform duplex scanning, color scan setting, etc.). The controller 40 of the scanner SC may send information indicating the process capability to the portable terminal PT via the wireless LAN I/F 20.

(Modification 5) In the embodiments described above, the controller 40 of the portable terminal PT sends the status confirmation request to the scanner SC (S118 of FIG. 5, S318 of FIG. 13) before sending the scan performing instruction to the scanner SC (or the multiple function peripheral MFP) (S124 of FIG. 5, S324 of FIG. 13). Instead, the controller 40 of the portable terminal PT may send the scan performing instruction to the scanner SC (or the multiple function peripheral MFP) without sending a status confirmation request to the scanner SC.

(Modification 6) The Wi-Fi connection is not restricted to being established in accordance with the WFD scheme. Consequently, e.g., the scanner SC (or the multiple function peripheral MFP) and the portable terminal PT may establish a Wi-Fi connection via an access point (not shown; called "AP" below). In this modification, the Wi-Fi network formed by the AP is an example of "a wireless network". Further, an SSID, etc. to be used in the Wi-Fi network formed by the AP is an example of "network information".

(Modification 7) In the embodiments described above, in the case where the scan performing instruction is received from the portable terminal PT after the Wi-Fi connection with the portable terminal PT has been established (YES in S80 of FIG. 4, YES in S280 of FIG. 12), the controller 40 of the scanner SC (or the multiple function peripheral MFP)

performs a scan of the document, and sends image data to the portable terminal PT (S82 of FIG. 4, 5282 of FIG. 12). The case is not restricted thereto, and after the Wi-Fi connection with the portable terminal PT has been established, the controller 40 of the scanner SC (or the multiple function peripheral MFP) may perform a scan of the document and send image data to the portable terminal PT without having received the scan performing instruction from the portable terminal PT (may perform a so-called push scan). Further, in this modification, the controller 40 may not provide the document status DS to the NFC I/F 30. The portable terminal PT may not receive the document status DS from the scanner SC.

(Modification 8) In the embodiments described above, in the case where the document status DS received from the scanner SC (or the multiple function peripheral MFP) does not indicate "Present" (NO in S112 of FIG. 5, NO in S312 of FIG. 13), the controller 80 of the portable terminal PT causes the display unit 54 to display the selection screen for selecting whether to continue the scan. Instead, in the case where the document status DS received from the scanner SC does not indicate "Present", the controller 80 may cause the display unit 54 to display a home screen after activating the application APL. In this case, the user may input an instruction for performing a scan from the home screen.

(Modification 9) Further, in particular in the third embodiment, in the case where a print instruction has not been input (NO in S311 of FIG. 13), and the document status DS received from the multiple function peripheral MFP does not indicate "Present" (NO in S312), the controller 80 of the portable terminal PT may display the aforementioned home screen instead of the selection screen. In this modification, the user may input either of an instruction for performing a scan or an instruction for performing a print from the home screen.

(Modification 10) In the second embodiment, as shown in FIG. 11, the browser activate instruction and the URL are stored in the I/F memory 34 in the situation where a document has not been set, and in the situation in which the predetermined period has elapsed since the document was set. Further, in the situation where a document has been set on the ADF of the scanner SC and the predetermined period has not elapsed since the document was set, the wireless profile WP, the document status DS "Present", the application activate instruction AAI and the device information DI are stored in the I/F memory 34. The case is not restricted thereto, and nothing may be stored in the I/F memory 34 in a situation where a document has not been set, and a situation where the predetermined period has elapsed since the document was set. Further, only the wireless profile WP may be stored in the I/F memory 34 in the situation where a document has been set on the ADF of the scanner SC and the predetermined period has not elapsed since the document was set.

(Modification 11) In the embodiments described above, the storing instruction sent from the controller 40 to the NFC I/F 30 includes only the values to be changed in the I/F memory 34. The case is not restricted thereto, and the storing instruction may include values to be changed and values not to be changed in the I/F memory 34.

(Modification 12) In the embodiments described above, each process in FIG. 2 to FIG. 5, FIG. 12, and FIG. 13 are realized by software (i.e., program). However, at least one process of each process in FIG. 2 to FIG. 5, FIG. 12, and FIG. 13 may be implemented by hardware such as a logic circuit.

What is claimed is:

1. A function performing apparatus comprising:
a first interface configured to perform wireless communication in accordance with a first scheme by using a communication session being established between the function performing apparatus and a communication apparatus different from the function performing apparatus, the first interface configured to send to the communication apparatus, by using the communication session, scanner information including network information which is to be used in a wireless network and an activation instruction for activating an application program on the communication apparatus related to the function performing apparatus performing scanning;
a second interface configured to perform wireless communication in accordance with a second scheme different from the first scheme by using the wireless network to which both the function performing apparatus and the communication apparatus are to belong;
a scan performing unit configured to perform a scanning of a document to be placed on the function performing apparatus;
a sensor configured to detect whether the document is being placed on the function performing apparatus;
a processor; and
a memory storing computer-readable instructions therein, the computer-readable instructions, when executed by the processor, causing the function performing apparatus to perform:
determining, by using a detection result of the sensor, whether the function performing apparatus is in a placed state or a non-placed state, the placed state being a state where the document is being placed on the function performing apparatus, and the non-placed state being a state where the document is not being placed on the function performing apparatus;
causing the scan performing unit to perform the scanning of the document, in a first case where the communication session is established while the function performing apparatus is in the placed state, even if an instruction related to starting of the scanning is not given by a user to any of the function performing apparatus and the communication apparatus after the communication session has been established by using the first interface;
not causing the scan performing unit to perform the scanning of the document, in a second case where the communication session is established while the function performing apparatus is in the non-placed state;
creating, in a case where the scanning of the document is performed, image data based on a scan result obtained from the scan performing unit; and
sending the created image data to the communication apparatus, which activates the application program, via the second interface by using the wireless network.

2. The function performing apparatus as in claim 1, wherein
in the first case, the causing of the scan performing unit to perform the scanning is performed in response to receiving a scan performing instruction from the communication apparatus via the second interface by using the wireless network, and
in the second case, the causing of the scan performing unit to perform the scanning is not performed due to not receiving the scan performing instruction from the communication apparatus.

3. The function performing apparatus as in claim 2, wherein the computer-readable instructions, when executed by the processor, cause the function performing apparatus to further perform:
providing non-placed related information which is related to the non-placed state to the first interface in a case where the function performing apparatus is in the non-placed state, the non-placed related information being sent to the communication apparatus by using the communication session in the second case; and
in the first case, receiving the scan performing instruction from the communication apparatus, in response to the network information being sent to the communication apparatus by using the communication session without the non-placed related information being sent to the communication apparatus, wherein in the second case, the scan performing instruction is not received from the communication apparatus, in response to both the network information and the non-placed related information being sent to the communication apparatus by using the communication session.

4. The function performing apparatus as in claim 2, wherein the computer-readable instructions, when executed by the processor, cause the function performing apparatus to further perform:
providing non-placed related information which is related to the non-placed state to the first interface in a case where the function performing apparatus is in the non-placed state, the non-placed related information being sent to the communication apparatus by using the communication session in the second case, the non-placed related information including display information for causing a display unit of the communication apparatus to display an informing screen indicating that the function performing apparatus is in the non-placed state; and
in the first case, receiving the scan performing instruction from the communication apparatus, in response to the network information being sent to the communication apparatus by using the communication session without the non-placed related information being sent to the communication apparatus, wherein in the second case, the scan performing instruction is not received from the communication apparatus, in response to the non-placed related information being sent to the communication apparatus by using the communication session without the network information being sent to the communication apparatus.

5. The function performing apparatus as in claim 2, wherein the computer-readable instructions, when executed by the processor, cause the function performing apparatus to further perform:
providing placed related information which is related to the placed state to the first interface in a case where the function performing apparatus is in the placed state, the placed related information being sent to the communication apparatus by using the communication session in the first case; and
in the first case, receiving the scan performing instruction from the communication apparatus, in response to both the network information and the placed related information being sent to the communication apparatus by using the communication session, wherein in the second case, the scan performing instruction is not received from the communication apparatus due to the placed related information being not sent to the communication apparatus.

6. The function performing apparatus as in claim 5, wherein
the providing of the placed related information includes:
providing a first type of the placed related information to the first interface when the state of the function performing apparatus changes from the non-placed state to the placed state; and
providing a second type of the placed related information to the first interface when a period during which the placed state is maintained has reached a predetermined period since the state of the function performing apparatus changed from the non-placed state to the placed state, and
the receiving of the scan performing instruction includes:
in the first case, receiving the scan performing instruction from the communication apparatus, in response to the first type of the placed related information being sent to the communication apparatus by using the communication session; and
in the first case, receiving the scan performing instruction on a condition that a predetermined instruction is given by the user to the communication apparatus, in response to the second type of the placed related information being sent to the communication apparatus by using the communication session, the predetermined instruction being related to an indication that the scan performing instruction is to be sent to the function performing apparatus.

7. The function performing apparatus as in claim 2, further comprising:
a print performing unit,
wherein the computer-readable instructions, when executed by the processor, cause the function performing apparatus to further perform:
in the first case, receiving a print performing instruction from the communication apparatus instead of the scan performing instruction via the second interface by using the wireless network, the print performing instruction including target data being a printing target; and
causing the print performing unit to perform a printing of an image represented by the target data in a case where the print performing instruction is received.

8. The function performing apparatus as in claim 1, wherein
the first interface comprises an interface memory,
the computer-readable instructions, when executed by the processor, cause the function performing apparatus to further perform:
causing the interface memory to store the network information by providing the network information to the first interface before the communication session is established.

9. The function performing apparatus as in claim 8, wherein
the network information is provided to the first interface when the state of the function performing apparatus changes from the non-placed state to the placed state, and
the computer-readable instructions, when executed by the processor, cause the function performing apparatus to further perform:
deleting the network information from the first interface when the state of the function performing apparatus changes from the placed state to the non-placed state.

10. The function performing apparatus as in claim 1, wherein the first interface is an NFC tag.

11. A non-transitory computer-readable medium storing an application program including computer-readable instructions for a communication apparatus, wherein the computer-readable instructions, when executed by a processor mounted on the communication apparatus, cause the communication apparatus to perform:
receiving, from a function performing apparatus different from the communication apparatus, scanner information including network information to be used in a wireless network to which both the communication apparatus and the function performing apparatus are to belong and an activation instruction for activating the application program on the communication apparatus related to the function performing apparatus performing scanning, via a first interface of the communication apparatus, the wireless network being a network for performing wireless communication between the communication apparatus and the function performing apparatus via a second interface of the communication apparatus, the first interface being an interface configured to perform wireless communication in accordance with a first scheme, and the second interface being an interface configured to perform wireless communication in accordance with a second scheme different from the first scheme;
receiving related information related to a state of the function performing apparatus from the function performing apparatus via at least one of the first interface and the second interface;
sending a scan performing instruction to the function performing apparatus via the second interface by using the wireless network, in a first case where the received related information is placed related information, even if an instruction related to starting of a scanning is not given by a user to any of the function performing apparatus and the communication apparatus after a communication session has been established by using the first interface, the placed related information being information related to a placed state, and the placed state being a state where a document is being placed on the function performing apparatus;
not sending the scan performing instruction to the function performing apparatus, in a second case where the received related information is non-placed related information, the non-placed related information being information related to a non-placed state, the non-placed state being a state where the document is not being placed on the function performing apparatus; and
receiving image data from the function performing apparatus via the second interface by using the wireless network after the scan performing instruction has been sent to the function performing apparatus, the image data being created by the function performing apparatus scanning the document.

12. The non-transitory computer-readable medium as in claim 11, wherein the related information is received from the function performing apparatus via the first interface.

13. The non-transitory computer-readable medium as in claim 11, wherein
the computer-readable instructions, when executed by the processor, cause the communication apparatus to further perform:
in the second case, causing a display unit of the communication apparatus to display a first selection screen for causing the user to select whether the scan performing instruction should be sent or not;
sending a confirmation request for requesting a state of the function performing apparatus to the function performing apparatus via the second interface by using the wireless network, on a condition that a predetermined instruction is given to the communication apparatus by the user in the first selection screen, the predetermined instruction being related to an indication that the scan performing instruction should be sent to the function performing apparatus; and
re-receiving the related information from the function performing apparatus via the second interface by using the wireless network after the confirmation request has been sent to the function performing apparatus, and
wherein in a case where the re-received related information is the placed related information, the scan performing instruction is sent to the function performing apparatus.

14. The non-transitory computer-readable medium as in claim 11, wherein
the scan performing instruction is sent to the function performing apparatus in the first case where the received related information is a first type of placed related information,
the computer-readable instructions, when executed by the processor, cause the communication apparatus to further perform:
causing, in a case where the received related information is a second type of placed related information, a display unit of the communication apparatus to display a second selection screen for causing the user to select whether the scan performing instruction should be sent or not,
the scan performing instruction is sent to the function performing apparatus in the first case where the received related information is the second type of placed related information, on a condition that an instruction is given by the user, the instruction being related to an indication that the scan performing instruction should be sent to the function performing apparatus,
the first type of placed related information is sent from the function performing apparatus, after the state of the function performing apparatus has changed from the non-placed state to the placed state, and before a period during which the placed state is maintained reaches a predetermined period, and
the second type of placed related information is sent from the function performing apparatus, after the period during which the placed state is maintained has reached the predetermined period.

15. The non-transitory computer-readable medium as in claim 11, wherein
the non-placed related information includes display information for causing a display unit of the communication apparatus to display an informing screen indicating that the function performing apparatus is in the non-placed state, and
the computer-readable instructions, when executed by the processor, cause the communication apparatus to further perform:
in the second case, causing the display unit to display the informing screen by using the display information.

16. The non-transitory computer-readable medium as in claim 11, wherein the computer-readable instructions, when executed by the processor, cause the communication apparatus to further perform:

sending, in a case where the network information and the related information are received after an instruction related to an indication that a print performing instruction is to be sent to the function performing apparatus has been given by the user, the print performing instruction including target data of a printing target, to the function performing apparatus, instead of the scan performing instruction via the second interface by using the wireless network regardless of whether the received related information is the placed related information or the non-placed related information.

17. A communication apparatus comprising:

a first interface configured to perform wireless communication in accordance with a first scheme by using a communication session established between the communication apparatus and a function performing apparatus different from the communication apparatus;

a second interface configured to perform wireless communication in accordance with a second scheme different from the first scheme by using a wireless network to which both the communication apparatus and the function performing apparatus are to belong;

a processor; and a memory storing computer-readable instructions therein, a portion of the computer-readable instructions being included in an application program, the computer-readable instructions, when executed by the processor, causing the communication apparatus to perform:

receiving scanner information including network information to be used in the wireless network and an activation instruction for activating the application program related to the function performing apparatus performing scanning from the function performing apparatus via the first interface;

receiving related information related to a state of the function performing apparatus from the function performing apparatus via at least one of the first interface and the second interface;

sending a scan performing instruction to the function performing apparatus via the second interface by using the wireless network, in a first case where the received related information is placed related information, even if an instruction related to starting of a scanning is not given by a user to any of the function performing apparatus and the communication apparatus after the communication session has been established by using the first interface, the placed related information being information related to a placed state, and the placed state being a state where a document is being placed on the function performing apparatus;

not sending the scan performing instruction to the function performing apparatus, in a second case where the received related information is non-placed related information, the non-placed related information being information related to a non-placed state, and the non-placed state being a state where the document is not being placed on the function performing apparatus; and receiving image data from the function performing apparatus via the second interface by using the wireless network after the scan performing instruction has been sent to the function performing apparatus, the image data being created by the function performing apparatus scanning the document.

* * * * *